US010156452B2

United States Patent
Thangaraj et al.

(10) Patent No.: US 10,156,452 B2
(45) Date of Patent: Dec. 18, 2018

(54) METHOD AND SYSTEM FOR RIDESHARING MANAGEMENT

(71) Applicant: Conduent Business Services, LLC, Dallas, TX (US)

(72) Inventors: Raja Subramaniam Thangaraj, Karur (IN); Gurulingesh Raravi, Bangalore (IN); Koyel Mukherjee, Bangalore (IN); Asmita Metrewar, Nanded (IN); Narendra Annamaneni, Ananthapur (IN); Harish Krishnamurthy, Bangalore (IN)

(73) Assignee: CONDUENT BUSINESS SERVICE, LLC, Dallas, TX (US)

( * ) Notice: Subject to any disclaimer, the term of this patent is extended or adjusted under 35 U.S.C. 154(b) by 71 days.

(21) Appl. No.: 15/350,204

(22) Filed: Nov. 14, 2016

(65) Prior Publication Data
US 2018/0135993 A1    May 17, 2018

(51) Int. Cl.
*G06F 3/0486* (2013.01)
*G06Q 50/30* (2012.01)
(Continued)

(52) U.S. Cl.
CPC ..... *G01C 21/3438* (2013.01); *G01C 21/3676* (2013.01); *G06Q 10/047* (2013.01);
(Continued)

(58) Field of Classification Search
USPC ........................................................ 701/410
See application file for complete search history.

(56) References Cited

U.S. PATENT DOCUMENTS

| 4,360,875 A | 11/1982 | Behnke |
| 6,697,730 B2 | 2/2004 | Dickerson |

(Continued)

FOREIGN PATENT DOCUMENTS

| WO | WO 2007/139375 A1 | 12/2007 |
| WO | WO 2015/077634 A1 | 5/2015 |

OTHER PUBLICATIONS

J. Xiao, D. Pelzer, D. Zehe, M. H. Lees, A. C. Knoll, and H. Aydt. A partition-based match making algorithm for dynamic ridesharing. IEEE Transactions on Intelligent Transportation Systems, 16(5):2587{2598, 2015.

M. Ota, H. Vo, C. Silva, and J. Freire. A scalable approach for data-driven taxi ride-sharing simulation. In IEEE International Conference on Big Data (Big Data), pp. 888{897, 2015.
(Continued)

*Primary Examiner* — Maceeh Anwari
(74) *Attorney, Agent, or Firm* — Jones Robb, PLLC

(57) ABSTRACT

The disclosed embodiments illustrate method of data processing for ridesharing management. The method includes retrieving multi-tier location data, comprising at least a plurality of clusters, of a geographical area from one or more data storage devices. The method further includes determining a set of available rides from a plurality of available rides in real time, associated with one or more source clusters and one or more destination clusters from the plurality of clusters. The method further includes rendering first information pertaining to the set of available rides through a first user-interface on the mobile computing device for user selection of at least one available ride from the set of available rides. The method further includes determining a shortest route for the selected at least one available ride, wherein second information pertaining to the determined shortest route is rendered through a second user-interface on the mobile computing device of the user.

18 Claims, 8 Drawing Sheets

(51) Int. Cl.
*G06F 3/0482* (2013.01)
*H04L 29/06* (2006.01)
*G01C 21/34* (2006.01)
*H04L 29/08* (2006.01)
*H04B 1/3827* (2015.01)
*G01C 21/36* (2006.01)
*G06Q 10/04* (2012.01)

(52) U.S. Cl.
CPC ........... *H04B 1/3833* (2013.01); *H04L 67/12* (2013.01); *H04L 67/18* (2013.01); *H04L 67/42* (2013.01)

(56) References Cited

U.S. PATENT DOCUMENTS

| | | | |
|---|---|---|---|
| 7,080,019 | B1 | 7/2006 | Hurzeler |
| 8,799,038 | B2 | 8/2014 | Chen et al. |
| 9,111,315 | B2 | 8/2015 | Mitchell |
| 9,426,625 | B2 | 8/2016 | Alberth, Jr. et al. |
| 2004/0158483 | A1 | 8/2004 | Lecouturier |
| 2007/0276595 | A1 | 11/2007 | Lewinson et al. |
| 2010/0114626 | A1 | 5/2010 | Piccinini et al. |
| 2011/0016146 | A1 | 1/2011 | Teufel |
| 2015/0204684 | A1* | 7/2015 | Rostamian ......... G01C 21/3438 701/537 |
| 2018/0067620 | A1* | 3/2018 | Adler .................... G06F 3/0486 |

OTHER PUBLICATIONS

U. Feige. A threshold of In n for approximating set cover (preliminary version). In Proceedings of the twenty-eighth annual ACM Symposium on Theory of Computing (STOC), pp. 314{318, 1996.

T. F. Gonzalez. Clustering to minimize the maximum intercluster distance. Theoretical Computer Science, 38:293{306, 1985.

D. O. Santos and E. C. Xavier. Dynamic taxi and ridesharing: A framework and heuristics for the optimization problem. In Proceedings of the Twenty-Third International Joint Conference on Artificial Intelligence (IJCAI), vol. 13, pp. 2885{2891, 2013.

N. A. Agatz, A. L. Erera, M. W. Savelsbergh, and X. Wang. Dynamic ridesharing: A simulation study in metro atlanta. Transportation Research Part B: Methodological, 45(9)1450{1464, 2011.

R. Geisberger, D. Luxen, S. Neubauer, P. Sanders, and L. Volker. Fast detour computation for ride sharing. arXiv preprint arXiv:0907. 5269, 2009.

Y. Huang, F. Bastani, R. Jin, and X. S. Wang. Large scale real-time ridesharing with service guarantee on road networks. Proceedings of the VLDB Endowment, 7(14):2017{2028, 2014.

B. Cao, L. Alarabi, M. F. Mokbel, and A. Basalamah. Sharek: A scalable dynamic ride sharing system. In 16th IEEE International Conference on Mobile Data Management (MDM), vol. 1, pp. 4{13, 2015.

S. Ma, Y. Zheng, and O. Wolfson. T-share: A large-scale dynamic taxi ridesharing service. In 29th IEEE International Conference on Data Engineering (ICDE), pp. 410{421, 2013.

* cited by examiner

METHOD AND SYSTEM FOR RIDESHARING MANAGEMENT

TECHNICAL FIELD

The presently disclosed embodiments are related, in general, to data processing. More particularly, the presently disclosed embodiments are related to a method and system for ridesharing management.

BACKGROUND

Recent developments in the field of travel management systems and online platforms have led to the evolution of various sustainable and environment-friendly commuting modes, such as ridesharing, which may cater to various traveling requirements of a commuter. Specifically, ridesharing services have emerged as a popular solution to increasing congestion along road networks around the world. Usually, such ridesharing services are managed by well-established commercial service providers, who have deployed vehicles for ridesharing on various routes.

In certain scenarios, a vehicle owner may also offer his/her vehicle for ridesharing through various ridesharing services. However, such ridesharing offers are required to be made well in advance to manage the intensive shortest path computation during ride matching. Further, in such cases various constraints, such as detour distance of the vehicle owners and walking distance of the rideshare commuters, are overlooked. Such ridesharing services may not offer a dynamically adaptable solution that may accommodate various unanticipated cancellations and new requests in real time. Therefore, a robust method and system are needed to manage peer-to-peer ridesharing in real time, along with taking care of all constraints.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

According to embodiments illustrated herein, there is provided a method of data processing by a computing device for ridesharing management. The method includes retrieving, by one or more processors in the computing device, multi-tier location data, comprising at least a plurality of clusters, of a geographical area from one or more data storage devices based on a ridesharing request received from a mobile computing device associated with a user, wherein the ridesharing request comprises a source location, a destination location, and one or more user constraints. The method further includes determining, by the one or more processors, a set of available rides from a plurality of available rides in real time, associated with one or more source clusters and one or more destination clusters from the plurality of clusters, based on at least the one or more user constraints and one or more pre-determined constraints associated with each of the plurality of available rides. The method further includes rendering, by the one or more processors, first information pertaining to the set of available rides through a first user-interface on the mobile computing device for user selection of at least one available ride from the set of available rides. The method further includes determining, by the one or more processors, a shortest route, which encompasses at least a source cluster from the one or more source clusters and a destination cluster from the one or more destination clusters, for the selected at least one available ride, wherein second information pertaining to the determined shortest route is rendered through a second user-interface on the mobile computing device of the user.

According to embodiments illustrated herein, there is provided a system of data processing by a computing device for ridesharing management. The system includes one or more processors in the computing device configured to retrieve multi-tier location data, comprising at least a plurality of clusters, of a geographical area from one or more data storage devices based on a ridesharing request received from a mobile computing device associated with a user, wherein the ridesharing request comprises a source location, a destination location, and one or more user constraints. The system includes the one or more processors in the computing device further configured to determine a set of available rides from a plurality of available rides in real time, associated with one or more source clusters and one or more destination clusters from the plurality of clusters, based on at least the one or more user constraints and one or more pre-determined constraints associated with each of the plurality of available rides. The system includes the one or more processors in the computing device further configured to render first information pertaining to the set of available rides through a first user-interface on the mobile computing device for user selection of at least one available ride from the set of available rides. The system includes the one or more processors in the computing device further configured to determine a shortest route, which encompasses at least a source cluster from the one or more source clusters and a destination cluster from the one or more destination clusters, for the selected at least one available ride, wherein second information pertaining to the determined shortest route is rendered through a second user-interface on the mobile computing device of the user.

According to embodiments illustrated herein, there is provided a system of data processing by a mobile computing device for ridesharing management. The system includes one or more processors in the mobile computing device configured to transmit a ridesharing request to a computing device, wherein the ridesharing request comprises a source location, a destination location, and one or more user constraints specified by a user associated with the mobile computing device. The system includes the one or more processors in the mobile computing device further configured to receive first information pertaining to a set of available rides from the computing device, wherein the set of available rides is determined by the computing device in real time, based on at least the one or more user constraints and one or more pre-determined constraints associated with each of a plurality of available rides, wherein the set of available rides is associated with one or more source clusters and one or more destination clusters from a plurality of clusters in multi-tier location data. The system includes the one or more processors in the mobile computing device further configured to transmit a user selection of at least one available ride from the set of available rides to the computing device. The system includes the one or more processors in the mobile computing device further configured to receive second information pertaining to a shortest route, which encompasses at least a source cluster from the one or more source clusters and a destination cluster from the one or more destination clusters, for the selected at least one available ride from the computing device, wherein the shortest route is determined by the computing device.

According to embodiments illustrated herein, there is provided a computer program product for use with a computing device. The computer program product comprises a non-transitory computer readable medium storing a computer program code for data processing for ridesharing management. The computer program code is executable by one or more processors in a computing device to retrieve multi-tier location data, comprising at least a plurality of clusters, of a geographical area from one or more data storage devices based on a ridesharing request received from a mobile computing device associated with a user, wherein the ridesharing request comprises a source location, a destination location, and one or more user constraints. The computer program code is further executable by the one or more processors in the computing device to determine a set of available rides from a plurality of available rides in real time, associated with one or more source clusters and one or more destination clusters from the plurality of clusters, based on at least the one or more user constraints and one or more pre-determined constraints associated with each of the plurality of available rides. The computer program code is further executable by the one or more processors in the computing device to render first information pertaining to the set of available rides through a first user-interface on the mobile computing device for user selection of at least one available ride from the set of available rides. The computer program code is further executable by the one or more processors in the computing device to determine a shortest route, which encompasses at least a source cluster from the one or more source clusters and a destination cluster from the one or more destination clusters, for the selected at least one available ride, wherein second information pertaining to the determined shortest route is rendered through a second user-interface on the mobile computing device of the user.

BRIEF DESCRIPTION OF DRAWINGS

The accompanying drawings illustrate the various embodiments of systems, methods, and other aspects of the disclosure. Any person with ordinary skills in the art will appreciate that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa. Furthermore, the elements may not be drawn to scale.

Various embodiments will hereinafter be described in accordance with the appended drawings, which are provided to illustrate the scope and not to limit it in any manner, wherein like designations denote similar elements, and in which.

DETAILED DESCRIPTION

Figure 1:
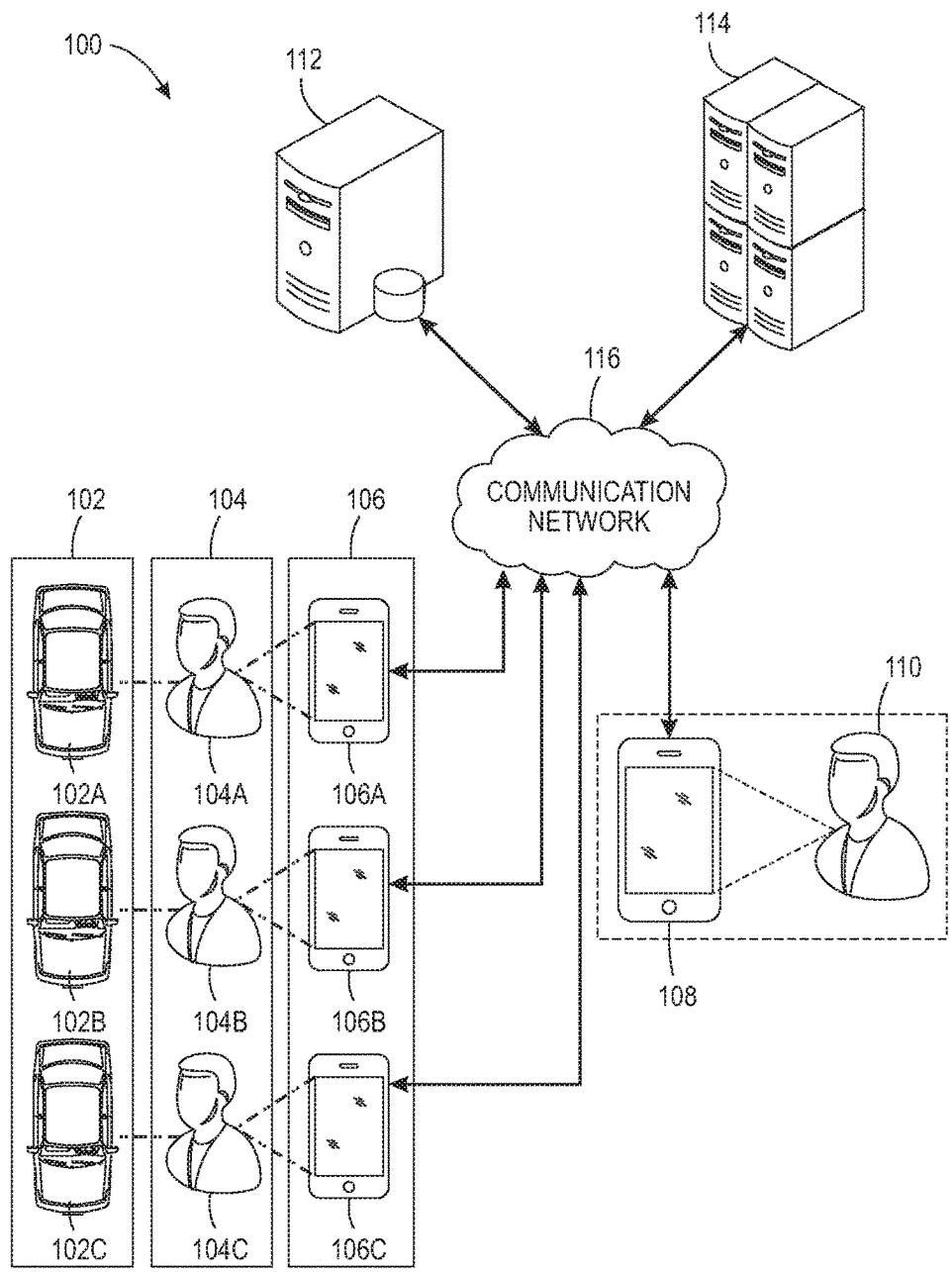
FIG. 1 is a block diagram that illustrates a system environment, in which various embodiments can be implemented, in accordance with at least one embodiment.

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on, indicate that the embodiment(s) or example(s) may include a particular feature, structure, characteristic, property, element, or limitation, but that not every embodiment or example necessarily includes that particular feature, structure, characteristic, property, element, or limitation. Furthermore, repeated use of the phrase "in an embodiment" does not necessarily refer to the same embodiment.

Definitions

The following terms shall have, for the purposes of this application, the meanings set forth below.

A "mobile computing device" refers to a computer, a device (that includes one or more processors/microcontrollers and/or any other electronic components), or a system (that performs one or more operations according to one or more programming instructions/codes) associated with a user, such as a commuter. In an embodiment, the mobile computing device may be utilized by the user to transmit a ridesharing request. Examples of the mobile computing device may include, but are not limited to, a laptop, a personal digital assistant (PDA), a mobile device, a smartphone, and a tablet computer (e.g., iPad® and Samsung Galaxy Tab®).

An "agent-computing device" refers to a computer, a device (that includes one or more processors/microcontrollers and/or any other electronic components), or a system (that performs one or more operations according to one or more programming instructions/codes) associated with a user, such as a driver of a vehicle. In an embodiment, the agent-computing device may be utilized by the driver to transmit a ride offer. Examples of the agent-computing device may include, but are not limited to, a laptop, a PDA, a mobile device, a smartphone, and a tablet computer (e.g., iPad® and Samsung Galaxy Tab®).

"Multi-tier location data" represents hierarchal discretization of a geographical region. In an embodiment, the multi-tier location data may comprise three entities, such as a plurality of grids, a plurality of landmarks, and a plurality of clusters, into which the geographical region is divided. Further, the entities in the multi-tier location data may be inter-related with each other. Further, in an embodiment, the multi-tier location data may be stored as a hierarchal data structure at one or more memory units in one or more storage devices. Further, in an embodiment, the multi-tier location data may be utilized for facilitating ride matching in a ridesharing management system.

A "grid" in a plurality of grids refers to a bounded geographical region of a specified shape, such as a square, in a geographical area. Further, the grid may comprise a unique plurality of point locations (given longitude and latitude coordinates) in the geographical area. The geographical area may be divided into the plurality of grids, which have same dimensions. In an embodiment, each grid in the plurality of grids may be associated with a unique landmark, which lies within a specific distance range from the corresponding grid.

A "landmark" in a plurality of landmarks refers to a recognizable object or structure, which stands out from its near environment, in a geographical area used for navigational purposes. In an embodiment, a distance between any two landmarks in the plurality of landmarks is greater than or equal to a specific distance. Further, in an embodiment, a landmark in the plurality of landmarks may be associated with a set of grids in the plurality of grids. Examples of the landmark may include, but are not limited to, a bus stop, a shopping mall, and any important building.

A "cluster" in a plurality of clusters refers to a group of landmarks in a geographical area. Further, a landmark may be associated with only one cluster. In an embodiment, the landmarks associated with a cluster in the plurality of clusters lie within a specific distance with respect to each other.

"Ride information" refers to information associated with an available ride. In an embodiment, the ride information pertaining to the available ride may comprise a source location of the available ride, a destination location of the available ride, a count of vacant seats in the available ride, and a route of the available ride.

A "plurality of first clusters" refers to clusters in a plurality of clusters through which an available ride passes while traveling along a route. In an embodiment, the plurality of first clusters is associated with grids comprising point locations of the route. Further, for each first cluster in the plurality of first clusters, the available ride corresponds to a potential ride. Thus, the available ride associated with a first cluster may address any ridesharing request originating from a set of grids associated with the first cluster, if other constraints associated with the ridesharing request and the corresponding driver of the available ride are met.

A "set of second clusters" refers to clusters in a plurality of clusters that are reachable for an available ride while traveling along a route. In an embodiment, each second cluster in the set of second clusters lies within a detour distance threshold associated with the available ride. In an embodiment, the set of second clusters is associated with grids comprising point locations that are within the detour distance threshold from the route. Further, for each second cluster in the set of second clusters, the available ride corresponds to a potential ride. Thus, the available ride associated with a second cluster may address any ridesharing request originating from a set of grids associated with the second cluster, if other constraints associated with the ridesharing request and the corresponding driver of the available ride are met.

A "ridesharing request" refers to a request raised by a user who may want to commute from a source location to a destination location in an available ride. In an embodiment, the ridesharing request may comprise the source location, the destination location, and one or more user constraints, such as a walking distance threshold, a departure time, and/or the like. For example, a user may raise a ridesharing request to travel from a source location "S" to a destination location "D" at "10:00 a.m." The user may specify a walking distance threshold of "1 km" to reach any pickup point, where an available ride can pick the user.

"One or more user constraints" refer to constraints specified by a user in a ridesharing request. In an embodiment, the one or more user constraints may comprise a walking distance threshold and a departure time. In an embodiment, the walking distance threshold may refer to a maximum distance the user is willing to walk to reach a pickup location (i.e., a source cluster associated with an available ride). In an embodiment, the departure time may refer to a time instant at which the user wants to be picked up from the pickup location.

"One or more pre-determined constraints" refer to constraints specified by a driver associated with an available ride. In an embodiment, the one or more pre-determined constraints may comprise a detour distance threshold. In an embodiment, the detour distance threshold may refer to a maximum extra distance the driver is willing to travel to address a ridesharing request of a user.

An "available ride" in a plurality of available rides corresponds to a vehicle that is offered by a driver of the corresponding vehicle for ridesharing. In an embodiment, the driver may be traveling along a route in his/her vehicle. The vehicle may have some vacant seats. Thus, the driver may transmit a ride offer to a ridesharing management server for sharing his/her vehicle with other commuters. In such a case, the vehicle of the driver may correspond to an available ride in the plurality of available rides.

"One or more source clusters" refer to clusters, in a plurality of clusters, which are associated with a source location from where a user wants to be picked up by an available ride. In an embodiment, each of the one or more source clusters lies within a walking distance threshold, specified by the user, from the source location.

"One or more destination clusters" refer to clusters, in a plurality of clusters, which are associated with a destination location at which a user wants to be dropped by an available ride. In an embodiment, each of the one or more destination clusters lies within a walking distance threshold, specified by the user, from the destination location.

A "set of available rides" comprises available rides, from a plurality of available rides, which are matched to a ridesharing request from a user. In an embodiment, each available ride in the set of available rides is associated with at least one source cluster in one or more source clusters and at least one destination cluster in one or more destination clusters. Further, each available ride in the set of available rides meets one or more user constraints, such as a walking distance threshold and a departure time, specified by the user in the ridesharing request. In an embodiment, the user may select any available ride in the set of available rides to commute between a corresponding source location and a corresponding destination location. Further, each available ride in the set of available rides meets one or more predetermined constraints specified by corresponding drivers.

A "current detour distance threshold" refers to a detour distance threshold that remains after subtracting a detour distance, traveled by an available ride for picking up a user, from a detour distance threshold specified by a driver of the available ride at time of transmitting a ride offer.

FIG. 1 is a block diagram of a system environment in which various embodiments may be implemented. With reference to FIG. 1, there is shown a system environment 100 that includes a plurality of vehicles 102 associated with a plurality of drivers 104. For instance, a first vehicle 102A may be associated with a first driver 104A, a second vehicle 102B may be associated with a second driver 104B, and a third vehicle 102C may be associated with a third driver 104C. Further, each of the plurality of drivers 104 is associated with an agent-computing device. For instance, the first driver 104A may be associated with a first agent-computing device 106A, the second driver 104B may be associated with a second agent-computing device 106B, and the third driver 104C may be associated with a third agent-computing device 106C. The system environment 100 further includes a mobile computing device 108 associated with a user 110. The system environment 100 further includes a database server 112, an application server 114, and a communication network 116. Various devices in the system environment 100 may be interconnected over the communication network 116. FIG. 1 shows, for simplicity, three vehicles, such as the first vehicle 102A, the second vehicle 102B, and the third vehicle 102C, three agent-computing devices, such as the first agent-computing device 106A, the second agent-computing device 106B, and the third agent-computing device 106C, one mobile computing device, such as the mobile computing device 108, associated with one user, such as the user 110, one database server, such as the database server 112, and one application server, such as the application server 114. However, it will be apparent to a person having ordinary skill in the art that the disclosed embodiments may also be implemented using multiple vehicles, multiple agent-computing devices, multiple mobile computing devices, multiple database servers, multiple application servers, without departing from the scope of the disclosure.

Each of the plurality of vehicles 102 may refer to a transportation means utilized by any commuter to commute from a source location to a destination location. In an embodiment, each of the plurality of the vehicles 102 may correspond to a variety of transportation services, such as, but not limited to, a bus, a truck, and a car.

In an embodiment, each of the plurality of vehicles 102 may be associated with a corresponding driver among the plurality of drivers 104. For example, the first vehicle 102A may be associated with the first driver 104A, the second vehicle 102B may be associated with the second driver 104B, and the third vehicle 102C may be associated with the third driver 104C. In an embodiment, each of the plurality of drivers 104, such as the first driver 104A, the second driver 104B, and the third driver 104C, may be traveling in the corresponding vehicle along a corresponding route. Further, each of the plurality of drivers 104, such as the first driver 104A, the second driver 104B, and the third driver 104C, may have offered the corresponding vehicle, such as the first vehicle 102A, the second vehicle 102B, and the third vehicle 102C, respectively, for ridesharing along the corresponding route. In this scenario, the plurality of vehicles 102 may correspond to a plurality of available rides. Further, one or more users, such as the user 110, may avail the plurality of available rides (i.e., the plurality of vehicles 102) to commute from a corresponding source location to a corresponding destination location. In an embodiment, each of the plurality of drivers 104 may have specified one or more pre-determined constraints for ridesharing of the corresponding vehicle among the plurality of vehicles 102.

A person having ordinary skill in the art will understand that the scope of the disclosure is not limited to offering the plurality of vehicles 102 for ridesharing by the plurality of drivers 104. In an alternate embodiment, a service provider of a ridesharing service platform may have hired the plurality of drivers 104 for deploying the plurality of vehicles 102 for ridesharing in a geographical area.

In an embodiment, each of the plurality of drivers 104 may be associated with the plurality of agent-computing devices 106. For example, the first driver 104A may be associated with the first agent-computing device 106A, the second driver 104B may be associated with the second agent-computing device 106B, and the third driver 104C may be associated with the third agent-computing device 106C. In an embodiment, each of the plurality of agent-computing devices 106 may refer to a computing device, which may be communicatively coupled to the communication network 116. Further, each of the plurality of agent-computing devices 106 may include one or more processors and one or more memory units. The one or more memory units may include a computer readable code that may be executable by the one or more processors to perform one or more operations as specified by the corresponding driver among the plurality of drivers 104. In an embodiment, each of the plurality of agent-computing devices 106 may comprise a navigation device with inbuilt one or more positional sensors such as GPS sensors.

In an embodiment, each of the plurality of drivers 104 may utilize the corresponding agent-computing device from the plurality of agent-computing devices 106 for offering the corresponding vehicle for ridesharing. For example, the first driver 104A may utilize the first agent-computing device 106A, the second driver 104B may utilize the second agent-computing device 106B, and the third driver 104C may utilize the third agent-computing device 106C, to offer the corresponding vehicle from the plurality of vehicles 102 for ridesharing. Further, each of the plurality of drivers 104 may utilize the corresponding agent-computing device from the plurality of agent-computing devices 106 to specify the corresponding one or more pre-determined constraints.

The mobile computing device 108 may refer to a computing device that may be communicatively coupled to the communication network 116. In an embodiment, the mobile computing device 108 may be associated with the user 110. The mobile computing device 108 may comprise one or more processors and one or more memory units. The one or more memory units may include computer readable codes and instructions that may be executable by the one or more processors to perform one or more predetermined operations specified by the user 110. In an embodiment, the user 110 may utilize the mobile computing device 108 to transmit a ridesharing request to the application server 114, over the communication network 116. In an embodiment, the ridesharing request may comprise a source location, a destination location, and one or more user constraints specified by the user 110. Based on the ridesharing request, in an embodiment, the mobile computing device 108 may be configured to receive first information pertaining to a set of available rides from the application server 114. The user 110 may utilize the mobile computing device 108 to select at least one available ride from the set of available rides. Thereafter, the mobile computing device 108 may be configured to transmit information pertaining to the user selection of the at least one available ride to the application server 114. Further, the mobile computing device 108 may be configured to receive second information pertaining to the shortest route associated with the at least one available ride selected by the user 110 from the application server 114.

The mobile computing device 108 may correspond to a variety of computing devices, such as, but not limited to, a laptop, a PDA, a tablet computer, a smartphone, and a phablet.

The database server 112 may refer to a computing device that may be communicatively coupled to the communication network 116. In an embodiment, the database server 112 may be configured to perform one or more database operations. The one or more database operations may include one or more of, but not limited to, receiving, storing, processing, and transmitting one or more queries, data, or content. The one or more queries, data, or content may be received/transmitted from/to various components of the system environment 100. In an embodiment, the database server 112 may be configured to store multi-tier location data of a geographical area. In an embodiment, the geographical area may be divided into a plurality of grids of equal dimensions. Further, any point location (given by longitude and latitude coordinates) in the geographical area may be uniquely associated with a grid among the plurality of grids. The plurality of grids may represent a first entity of the multi-tier location data. In an embodiment, the geographical area may comprise a plurality of landmarks. The plurality of landmarks may represent a second entity of the multi-tier location data. Further, each landmark in the plurality of landmarks is associated with a set of grids in the plurality of grids. However, each grid in the plurality of grids is associated with a unique landmark in the plurality of landmarks. The multi-tier location data further comprises a plurality of clusters as a third entity. In an embodiment, one or more landmarks in the plurality of landmarks may represent a cluster in the plurality of clusters. In an embodiment, the one or more landmarks in a corresponding cluster from the plurality of clusters are within a first pre-determined distance from each other. In an embodiment, each of the plurality of clusters may be associated with a set of available rides from the plurality of available rides. In an embodiment, a memory unit in the database server 112 may be configured to store information associated with each cluster among the plurality of clusters. For example, the information associated with a cluster may comprise the set of available rides associated with the corresponding cluster.

In an embodiment, the database server 112 may be configured to store ride information pertaining to each of the plurality of available rides. In an embodiment, the ride information associated with an available ride may comprise a source location of the available ride, a destination location of the available ride, a count of vacant seats in the available ride, and a route of the available ride. Further, in an embodiment, the database server 112 may be configured to store information pertaining to an association of each available ride with a plurality of first clusters from the plurality of clusters and a set of second clusters from the plurality of clusters.

In an embodiment, the database server 112 may be further configured to store profile information of the user 110. In an embodiment, the user 110 may create a profile at the time of registration with the ridesharing service platform. In another embodiment, the user 110 may create the profile when he/she transmits the ridesharing request for the first time. In an embodiment, the database server 112 may be further configured to store profile information of each of the plurality of drivers 104. In an embodiment, the database server 112 may be configured to receive one or more queries from the application server 114 for the retrieval of the ride information pertaining to each of the plurality of available rides and the multi-tier location data.

For querying the database server 112, one or more querying languages, such as, but not limited to, SQL, QUEL, and DMX, may be utilized. In an embodiment, the database server 112 may connect to the application server 114, using one or more protocols, such as, but not limited to, the ODBC protocol and the JDBC protocol. In an embodiment, the database server 112 may be realized through various technologies such as, but not limited to, Microsoft® SQL Server, Oracle®, IBM DB2®, Microsoft Access®, PostgreSQL®, MySQL®, and SQLite®.

The application server 114 may refer to an electronic device, a computing device, or a software framework hosting an application or a software service that may be communicatively coupled to the communication network 116. In an embodiment, the application server 114 may be implemented to execute programs, routines, scripts, and/or the like, stored in one or more memory units for supporting the hosted application or the software service. In an embodiment, the hosted application or the software service may be configured to perform one or more predetermined operations for ridesharing management. In an embodiment, the application server 114 may be associated with the ridesharing service platform.

In an embodiment, the application server 114 may be configured to determine the multi-tier location data for a geographical area. For determining the multi-tier location data, the application server 114 may be configured to divide the geographical area into the plurality of grids of equal dimensions (such as 100 $m^2$). In an embodiment, any point location (given by longitude and latitude coordinates) in the geographical area may be uniquely associated with one grid among the plurality of grids. Further, the application server 114 may be configured to identify a centroid for each of the plurality of grids. In an embodiment, the centroid of a grid may be a geographical center of the corresponding grid. Thereafter, the application server 114 may be configured to associate one unique landmark among the plurality of landmarks with each of the plurality of grids. In other words, one landmark among the plurality of landmarks may be associated with the set of grids among the plurality of grids. However one grid among the plurality of grids is associated with only one landmark. In an embodiment, the application server 114 may be configured to associate one unique landmark among the plurality of landmarks with each of the plurality of grids. Thereafter, the application server 114 may be configured to group one or more landmarks into a cluster, such that the one or more landmarks in the cluster are within the first pre-determined distance from each other. Thus, the application server 114 may be configured to determine the plurality of clusters by grouping the plurality of landmarks. In an embodiment, the application server 114 may be configured to formulate a minimization problem for determining the plurality of clusters. The plurality of grids, the plurality of landmarks, and the plurality of clusters, collectively, form the multi-tier location data. In an embodiment, the application server 114 may be configured to store the multi-tier location data in the database server 112.

Further, in an embodiment, the application server 114 may be configured to receive a plurality of ride offers from the plurality of agent-computing devices 106 associated with the plurality of drivers 104. For example, the application server 114 may receive a ride offer from the first agent-computing device 106A associated with the first driver 104A over the communication network 116. The first driver 104A may be traveling in the first vehicle 102A along a route. There may be "three vacant seats" in the first vehicle 102A. In such a situation, the first driver 104A may want to share the "three vacant seats" in the first vehicle 102A with "three users" who may want to commute along the route. The first driver 104A may specify a detour distance threshold that he/she may be willing to travel for picking up the "three users." Thus, the first driver 104A may transmit the ride offer to the application server 114. In an embodiment, the plurality of vehicles 102 associated with the plurality of ride offers may correspond to the plurality of available rides. In an embodiment, the ride offer associated with an available ride from the plurality of available rides may comprise a source location of the available ride, a destination location of the available ride, a count of vacant seats in the available ride, a route of the available ride, and one or more pre-determined constraints such as the detour distance threshold.

In an embodiment, the application server 114 may be configured to determine the ride information corresponding to each of the plurality of available rides. The ride information corresponding to an available ride from the plurality of available rides may comprise the source location of the available ride, the destination location of the available ride, the count of vacant seats in the available ride, and the route of the available ride. In an embodiment, the application server 114 may be configured to determine the ride information pertaining to each of the plurality of available rides based on the corresponding ride offer. Further, the application server 114 may be configured to determine a plurality of first clusters and a set of second clusters from the plurality of clusters for each of the plurality of available rides. For an available ride, the plurality of first clusters may comprise the clusters through which the corresponding available ride may pass, while traveling along the corresponding route. Further, the set of second clusters may comprise the clusters that are reachable by the corresponding available ride based on the corresponding detour distance threshold. In an embodiment, the application server 114 may be configured to store the ride information of each of the plurality of available rides in the database server 112. Further, the application server 114 may be configured to store the ride information of an available ride in the memory units of the database server 112 associated with the corresponding associated clusters (i.e., the plurality of first clusters and the set of second clusters).

In an embodiment, the application server 114 may be configured to update the association of the plurality of available rides with the corresponding plurality of first clusters and the corresponding set of second clusters in real time. In an embodiment, the application server 114 may be configured to update the association of the plurality of available rides with the corresponding plurality of first clusters based on a part of a corresponding route traversed by the plurality of available rides. Further, the application server 114 may be configured to update the association of the plurality of available rides with the corresponding set of second clusters based on the part of the corresponding route traversed by the plurality of available rides and a corresponding current detour distance threshold associated with the plurality of available rides.

In an embodiment, the application server 114 may be configured to receive the ridesharing request from the mobile computing device 108 of the user 110. Thereafter, based on the ridesharing request, the application server 114 may be configured to determine one or more source clusters and one or more destination clusters from the plurality of clusters based on the one or more user constraints. In an embodiment, the one or more source clusters may be associated with the source location specified by the user 110 and the one or more destination clusters may be associated with the destination location specified by the user 110. Thereafter, the application server 114 may be configured to determine a set of available rides from the plurality of available rides based on the one or more user constraints and the one or more pre-determined constraints associated with each of the plurality of available rides.

In an embodiment, the application server 114 may be configured to render the first information pertaining to the set of available rides through a first user-interface on the mobile computing device 108 for the user selection of at least one available ride from the set of available rides. Thereafter, the application server 114 may be configured to receive the user selection of the at least one available ride from the mobile computing device 108. The user selection of the at least one available ride may correspond to a booking of the at least one available ride. In an embodiment, the application server 114 may be further configured to determine the shortest route for the selected at least one available ride. In an embodiment, the determined shortest route may encompass at least a source cluster from the one or more source clusters and a destination cluster from the one or more destination clusters. Thereafter, the application server 114 may be configured to render the second information pertaining to the determined shortest route through a second user-interface on the mobile computing device 108 of the user 110. Based on the second information, the application server 114 may be further configured to update the ride information of the selected at least one available ride.

The application server 114 may be realized through various types of application servers, such as, but not limited to, a Java application server, a .NET framework application server, a Base4 application server, a PHP framework application server, or any other application server framework.

A person having ordinary skill in the art will appreciate that the scope of the disclosure is not limited to realizing the application server 114 and the database server 112 as separate entities. In an embodiment, the functionalities of the database server 112 can be integrated into the application server 114, without departing from the scope of the disclosure. Further, in an embodiment, the application server 114 may be realized as an application program installed and/or running on each of the plurality of agent-computing devices 106 and/or the mobile computing device 108, without deviating from the scope of the disclosure.

An embodiment of the structure of the application server 114 has been discussed later in FIG. 2.

The communication network 116 may correspond to a medium through which content and messages flow among various devices, such as the plurality of agent-computing devices 106, the mobile computing device 108, the database server 112, and the application server 114, of the system environment 100. Examples of the communication network 116 may include, but are not limited to, a Wireless Fidelity (Wi-Fi) network, a Wireless Area Network (WAN), a Local Area Network (LAN), or a Metropolitan Area Network (MAN). Various devices in the system environment 100 can connect to the communication network 116 in accordance with various wired and wireless communication protocols, such as Transmission Control Protocol and Internet Protocol (TCP/IP), User Datagram Protocol (UDP), and 2G, 3G, or 4G communication protocols.

Figure 2:
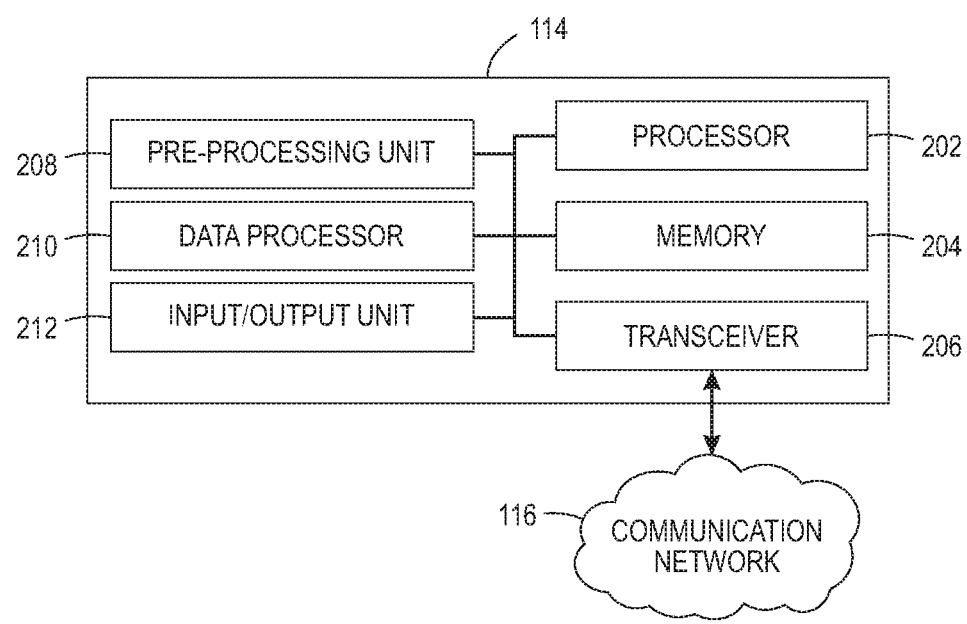
FIG. 2 is a block diagram that illustrates an application server, in accordance with at least one embodiment.

FIG. 2 is a block diagram that illustrates an application server, in accordance with at least one embodiment. FIG. 2 has been described in conjunction with FIG. 1. With reference to FIG. 2, there is shown a block diagram of the application server 114 that may include a processor 202, a memory 204, a transceiver 206, a pre-processing unit 208, a data processor 210, and an input/output (I/O) unit 212. The processor 202 is communicatively coupled to the memory 204, the transceiver 206, the pre-processing unit 208, the data processor 210, and the I/O unit 212.

The processor 202 includes suitable logic, circuitry, and/or interfaces that may be configured to execute one or more instructions stored in the memory 204. The processor 202 may further comprise an arithmetic logic unit (ALU) (not shown) and a control unit (not shown). The ALU may be coupled to the control unit. The ALU may be configured to perform one or more mathematical and logical operations and the control unit may control the operation of the ALU. The processor 202 may execute a set of instructions/programs/codes/scripts stored in the memory 204 to perform one or more operations for ridesharing management. In an embodiment, the processor 202 may be configured to receive a plurality of ride offers from the plurality of drivers 104 associated with the plurality of vehicles 102. In an embodiment, the processor 202 may be further configured to receive one or more ridesharing requests from one or more mobile computing devices, such as the mobile computing device 108, associated with one or more users, such as the user 110. In an embodiment, the processor 202 may be configured to render the first user-interface and the second user-interface on the one or more mobile computing devices, such as the mobile computing device 108, associated with one or more users, such as the user 110, who raised the ridesharing requests. The processor 202 may be implemented based on a number of processor technologies known in the art. Examples of the processor 202 may include, but are not limited to, an X86-based processor, a Reduced Instruction Set Computing (RISC) processor, an Application-Specific Integrated Circuit (ASIC) processor, and/or a Complex Instruction Set Computing (CISC) processor.

The memory 204 may be operable to store one or more machine codes, and/or computer programs having at least one code section executable by the processor 202. The memory 204 may store the one or more sets of instructions that are executable by the processor 202, the transceiver 206, the pre-processing unit 208, the data processor 210, and the I/O unit 212. In an embodiment, the memory 204 may include one or more buffers (not shown). In an embodiment, the one or more buffers may be configured to store information pertaining to the one or more source clusters and the one or more destination clusters associated with each of the one or more ridesharing requests. Further, in an embodiment, the one or more buffers may be configured to store real time ride information pertaining to the plurality of available rides. In an embodiment, the one or more buffers may be further configured to store intermediate information determined/retrieved during ridesharing management. In an embodiment, the one or more buffers may be further configured to store one or more shortest route computation algorithms, such as Dijkstra's algorithm, known in the art for determining the shortest route for the selected at least one available ride. Examples of some commonly known memory implementations may include, but are not limited to, a random access memory (RAM), a read only memory (ROM), a hard disk drive (HDD), and a secure digital (SD) card. In an embodiment, the memory 204 may include the one or more machine codes, and/or computer programs that are executable by the processor 202 to perform specific operations for ridesharing management. It will be apparent to a person having ordinary skill in the art that the one or more instructions stored in the memory 204 may enable the hardware of the application server 114 to perform the one or more predetermined operations, without deviating from the scope of the disclosure.

The transceiver 206 transmits/receives messages and data to/from various components, such as the plurality of agent-computing devices 106, the mobile computing device 108, and the database server 112, of the system environment 100, over the communication network 116. In an embodiment, the transceiver 206 may be communicatively coupled to the communication network 116. In an embodiment, the transceiver 206 may be configured to transmit the first information and the second information to the mobile computing device 108 associated with the user 110, who transmitted the ridesharing request. In an embodiment, the transceiver 206 may be configured to receive the user selection of the at least one available ride from the set of available rides. Examples of the transceiver 206 may include, but are not limited to, an antenna, an Ethernet port, a USB port, or any other port configured to receive and transmit data. The transceiver 206 transmits/receives the messages and data, in accordance with the various communication protocols, such as TCP/IP, UDP, and 2G, 3G, or 4G communication protocols.

The pre-processing unit 208 includes suitable logic, circuitry, and/or interfaces that are configured to execute one or more instructions stored in the memory 204. In an embodiment, the pre-processing unit 208 may be configured to determine the multi-tier location data for the geographical area. The pre-processing unit 208 may be realized through various electronic components, such as, but not limited to, a system on chip (SoC) component, an ASIC component, or a field-programmable gate array component.

A person having ordinary skill in the art will appreciate that the scope of the disclosure is not limited to realizing the pre-processing unit 208 and the processor 202 as separate entities. In an embodiment, the functionalities of the pre-processing unit 208 may be implemented within the processor 202, without departing from the spirit of the disclosure. Further, a person skilled in the art will understand that the scope of the disclosure is not limited to realizing the pre-processing unit 208 as a hardware component. In an embodiment, the pre-processing unit 208 may be implemented as a software module included in computer program code (stored in the memory 204), which may be executable by the processor 202 to perform the functionalities of the pre-processing unit 208.

The data processor 210 includes suitable logic, circuitry, and/or interfaces that are configured to execute the one or more sets of instructions stored in the memory 204. In an embodiment, the data processor 210 may be configured to determine/update the ride information pertaining to the plurality of available rides. In an embodiment, the data processor 210 may be configured to determine the plurality of first clusters and the set of second clusters from the plurality of clusters, which are associated with each of the plurality of available rides. Further, in an embodiment, the data processor 210 may be configured to determine the one or more source clusters and the one or more destination clusters for each of the one or more ridesharing requests. In an embodiment, the data processor 210 may be configured to determine the set of available rides for each of the one or more ridesharing requests in real time. Further, in an embodiment, the data processor 210 may be configured to determine the shortest route for the at least one available ride selected by the one or more users, such as the user 110. Examples of the data processor 210 may include, but are not limited to, an X86-based processor, a RISC processor, an ASIC processor, a CISC processor, and/or other processors.

Though the data processor 210 is depicted as a separate entity, a person skilled in the art will appreciate that the scope of the disclosure is not limited to realizing the functionality of the data processor 210 by the processor 202. In an embodiment, the data processor 210 may be implemented within the processor 202 without departing from the spirit of the disclosure. Further, a person skilled in the art will understand that the scope of the disclosure is not limited to realizing the data processor 210 as a hardware component. In an embodiment, the data processor 210 may be implemented as a software module included in computer program code (stored in the memory 204), which may be executable by the processor 202 to perform the functionalities of the data processor 210.

The I/O unit 212 may comprise suitable logic, circuitry, interfaces, and/or code that may be configured to provide an output to the user 110. The I/O unit 212 comprises various input and output devices that are configured to communicate with the processor 202. Examples of the input devices include, but are not limited to, a keyboard, a mouse, a joystick, a touch screen, a microphone, a camera, and/or a docking station. Examples of the output devices include, but are not limited to, a display screen and/or a speaker.

Figure 3:
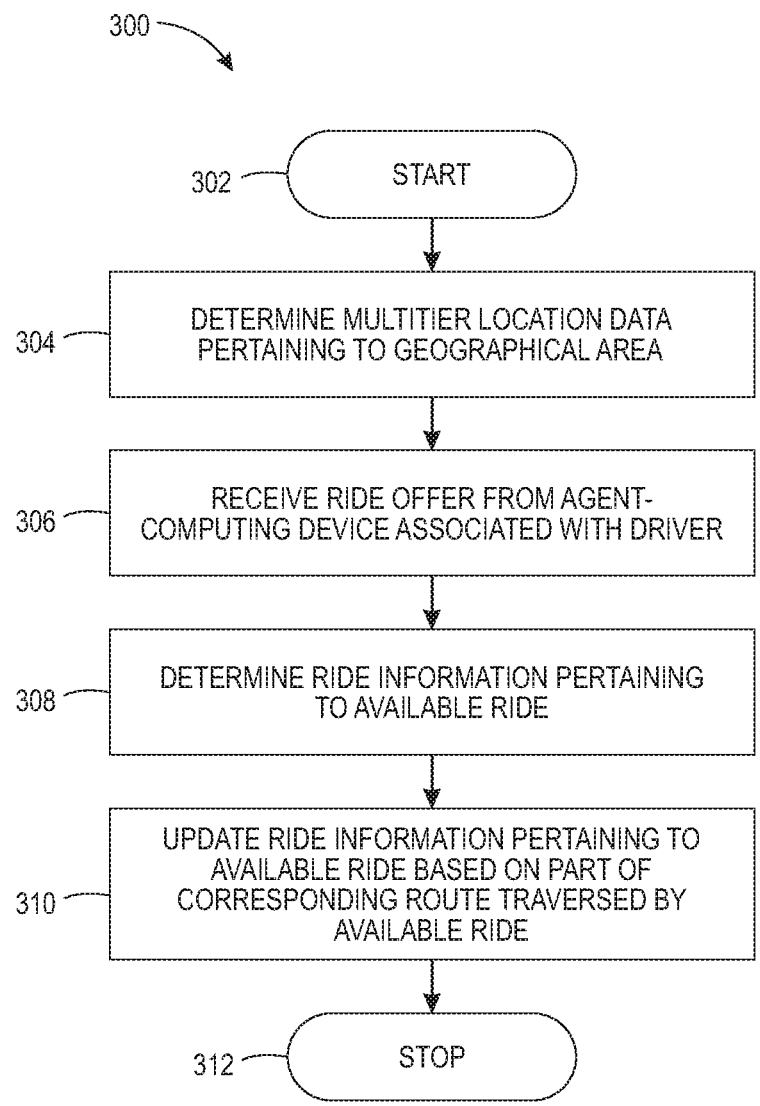
FIG. 3 is a flowchart that illustrates a method of ridesharing management, in accordance with at least one embodiment.

FIG. 3 is a flowchart that illustrates a method of managing ride offers in a ridesharing system, in accordance with at least one embodiment. FIG. 3 is described in conjunction with FIG. 1 and FIG. 2. With reference to FIG. 3, there is shown a flowchart 300 that illustrates a method of managing ride offers in a ridesharing system. A person with ordinary skills in the art will understand that for brevity, the ride offers comprise at least one ride offer from the first agent-computing device 106A associated with the first driver 104A. Notwithstanding, the disclosure may not be so limited, and the ride offers may include a plurality of ride offers from the plurality of agent-computing devices 106, without deviating from the scope of the disclosure. The method starts at step 302 and proceeds to step 304.

At step 304, the multi-tier location data pertaining to a geographical area is determined. In an embodiment, the pre-processing unit 208, in conjunction with the processor 202, may be configured to determine the multi-tier location data pertaining to the geographical area. In an embodiment, the multi-tier location data may correspond to a discrete representation of the geographical area.

For determining the multi-tier location data, the pre-processing unit 208 may be configured to identify all available landmarks in the geographical area. Thereafter, the pre-processing unit 208 may be configured to identify the plurality of landmarks from all the available landmarks. In an embodiment, the pre-processing unit 208 may be configured to identify the plurality of landmarks based on a second pre-determined distance. For instance, if distance between any two available landmarks is less than the second pre-determined distance, the pre-processing unit 208 may be configured to identify only one landmark from the two available landmarks as a landmark in the plurality of landmarks. In an embodiment, the second pre-determined distance may be determined based on a count of landmarks in the plurality of landmarks. For example, the second pre-determined distance may be higher when the pre-processing unit 208 identifies "16" landmarks to constitute the plurality of landmarks in a geographical area compared with another instance when the pre-processing unit 208 identifies "26" landmarks to constitute the plurality of landmarks in the geographical area.

Further, the pre-processing unit 208 may be configured to divide the geographical area in the plurality of grids with equal dimensions. In an embodiment, a grid in the plurality of grids may correspond to a bounded square geographical region in the geographical area. Further, each grid in the plurality of grids may comprise a unique plurality of point locations (given longitude and latitude coordinates) in the geographical area. In an exemplary scenario, the pre-processing unit 208 may divide the geographical area into the plurality of grids, where each grid corresponds to a bounded square geographical region of "100 m²." Further, the pre-processing unit 208 may be configured to identify a centroid of each of the plurality of grids. In an embodiment, the centroid of a grid may be a geographical center of the bounded square geographical region of the corresponding grid.

After the determination of the plurality of grids, the pre-processing unit 208 may be configured to associate each grid in the plurality of grids with a unique landmark in the plurality of landmarks. In an embodiment, the pre-processing unit 208 may be configured to associate a grid with a landmark, when the landmark is within a third pre-determined distance threshold from the centroid of the corresponding grid. In an embodiment, a grid in the plurality of grids may be associated with a unique landmark. However, a landmark in the plurality of landmarks may be associated with the set of grids in the plurality of grids. In other words, a relation between the plurality of grids and the plurality of landmarks may be many to one, but the association between the plurality of landmarks and the plurality of grids may be one to many.

Thereafter, the pre-processing unit 208 may be configured to group the one or more landmarks in the plurality of landmarks into a cluster. In an embodiment, the one or more landmarks in the cluster are within the first pre-determined distance from each other. Thus, the pre-processing unit 208 may be configured to determine the plurality of clusters by grouping the plurality of landmarks. Further, a landmark may be associated with only one cluster in the plurality of clusters. In an embodiment, the pre-processing unit 208 may be configured to utilize one or more minimization algorithms, such as 2-approximate greedy algorithm for Metric K-center, known in the art for determining the plurality of clusters.

In an exemplary scenario, the pre-processing unit 208 may be configured to formulate the minimization problem for determining the plurality of clusters using the following conditions:

$$\text{Minimize } m \qquad (1)$$

$$\text{such that } \Sigma_{j\in[n]}\gamma_j \leq m \qquad (2)$$

$$x_{i,j} \leq \gamma_j \, \forall i \in V, j \in [n] \qquad (3)$$

$$\Sigma_{j\in[n]} x_{i,j} = 1 \, \forall i \in V \qquad (4)$$

$$d_{i,i'}(x_{i,j} + x_{i',j} - 1) \leq \delta \, \forall i,i' \in V, \forall j \in [n] \qquad (5)$$

$$x_{i,j} \in \{0,1\} \, \forall i \in V, j \in [n] \qquad (6)$$

$$\gamma_j \in \{0,1\} \, \forall j \in [n] \qquad (7)$$

where, m represents a count of clusters, in the plurality of clusters, to be determined by the pre-processing unit 208;

V represents a plurality of landmarks in the geographical area, such that the count of landmarks in the plurality of landmarks is n;

$y_j$ represents a Boolean indicator that indicates whether a $j^{th}$ cluster is used or not;

$x_{i,j}$ represents a Boolean indicator that indicates whether an $i^{th}$ landmark in the plurality of landmarks V is associated with the $j^{th}$ cluster;

$x_{i',j}$ represents a Boolean indicator that indicates whether an $i'^{th}$ landmark in the plurality of landmarks V is associated with the $j^{th}$ cluster;

$d_{i,i'}$ represents a pair-wise distance between the $i^{th}$ landmark and the $i'^{th}$ landmark; and $\delta$ represents the first pre-determined distance.

As shown above, the minimization problem is represented in equation (1), while equations (2)-(7) represent a set of constraints for the minimization problem. Equation (2) sets a constraint that the count of clusters m is equal to a sum of $y_d$'s over all $j \in [n]$. Equation (3) represents a constraint that the $i^{th}$ landmark may be associated with the $j^{th}$ cluster, only if the $j^{th}$ cluster is used. Equation (4) represents a constraint that every landmark in the plurality of landmarks V must be associated with at least one cluster in the plurality of clusters. Equation (5) represents a constraint that if two landmarks, such as the $i^{th}$ landmark and the $i'^{th}$ landmark, are grouped in a same cluster, then their pair-wise distance should be less than or equal to the first pre-determined distance $\delta$. Equations (6) and (7) indicate that $x_{i,j}$ and $y_j$ correspond to Boolean indicators.

A person having ordinary skill in the art will understand that the abovementioned exemplary scenario is for illustrative purpose and should not be construed to limit the scope of the disclosure. Further, in an embodiment, the pre-processing unit 208 may use one or more approximations, such as on the first pre-determined distance threshold, for determining the plurality of clusters, without deviating the scope of the disclosure.

In an embodiment, the pre-processing unit 208 may be further configured to determine a centroid for each cluster in the plurality of clusters. After the determination of the multi-tier location data, the processor 202, in conjunction with the transceiver 206, may be configured to store the multi-tier location data at the one or more memory units in the database server 112. In an embodiment, the multi-tier location data may be stored as a hierarchal data structure at the one or more memory units in the database server 112.

At step 306, a ride offer is received from an agent-computing device associated with a driver. In an embodiment, the processor 202, in conjunction with the transceiver 206, may be configured to receive the ride offer from an agent-computing device, such as the first agent-computing device 106A, associated with the driver, such as the first driver 104A. In such a case, the first vehicle 102A associated with the first driver 104A may correspond to an available ride. In an embodiment, the ride offer may comprise the source location of the available ride, the destination location of the available ride, the count of vacant seats in the available ride, the route of the available ride, and the one or more pre-determined constraints associated with the available ride.

In an exemplary scenario, the first driver 104A may be traveling in the first vehicle 102A along a route. There may be "three vacant seats" in the first vehicle 102A. In such a scenario, the first driver 104A may transmit a ride offer for sharing his/her corresponding vehicle 102A with one or more users. The first driver 104A may specify the source location of the first vehicle 102A, the destination location of the first vehicle 102A, the count of vacant seats in the first vehicle 102A, and the route of the first vehicle 102A. The first driver 104A may further specify the one or more pre-determined constraints. The one or more pre-determined constraints may comprise the detour distance threshold, such as "4 km," which the first driver 104A may be willing to travel for picking up the one or more users.

A person having ordinary skill in the art will understand that the abovementioned exemplary scenario is for illustrative purpose and should not be construed to limit the scope of the disclosure. Further, in an embodiment, the first driver 104A may not specify the source location of the available ride in the ride offer. In such a case, the processor 202 may be configured to receive information pertaining to a current location of the first driver 104A from the one or more positional sensors, such as the GPS sensor, in the first agent-computing device 106A. Thus, the current location of the first driver 104A may correspond to the source location of the available ride.

At step 308, the ride information pertaining to the available ride is determined. In an embodiment, the data processor 210, in conjunction with the processor 202, may be configured to determine the ride information pertaining to the available ride. In an embodiment, the ride information pertaining to the available ride may comprise the source location of the available ride, the destination location of the available ride, the count of vacant seats in the available ride, and the route of the available ride. In an embodiment, the ride information may further comprise a departure time of the available ride and the detour distance threshold associated with the available ride.

Before determining the ride information, the data processor 210 may be configured to query the database server 112 to retrieve the multi-tier location data. In an embodiment, the data processor 210 may be configured to determine the ride information based on the received ride offer and the multi-tier location data. In an embodiment, the departure time of the available ride may be determined based on a time instant at which the ride offer was received.

In an embodiment, the data processor 210 may be further configured to determine the plurality of first clusters and the set of second clusters from the plurality of clusters, which are associated with the available ride. For determining the plurality of first clusters and the set of second clusters, the data processor 210 may utilize point locations associated with the route of the available ride. Based on the point locations associated with the route, the data processor 210 may be configured to identify grids, from the plurality of grids in the multi-tier location data, which are associated with the point locations of the route. Further, the data processor 210 may be configured to identify landmarks that are associated with the identified grids. Thereafter, the data processor 210 may be configured to determine clusters in the plurality of clusters that are associated with the identified landmarks. In an embodiment, the determined clusters that are associated with the identified landmarks may constitute the plurality of first clusters for the available ride. In other words, the plurality of first clusters may correspond to clusters that are associated with point locations through which the available ride may pass while traveling along the corresponding route.

After the determination of the plurality of first clusters, the data processor 210 may be configured to determine the set of second clusters based on the one or more pre-determined constraints, such as the detour distance threshold. In an embodiment, a second cluster in the set of second clusters may correspond to a reachable cluster. In an exemplary scenario, the data processor 210 may determine a cluster, in the plurality of clusters, as a second cluster, if the corresponding cluster satisfies conditions in equations (8) and (9), as shown below:

$$\text{dist}(CX) \leq d\text{lim} \quad (8)$$

$$\text{dist}(CX) + \text{dist}(XD) - \text{dist}(CD) \leq d\text{lim} \quad (9)$$

where,

C represents a centroid of a first cluster in the plurality of first clusters;

X represents a centroid of a cluster in the plurality of clusters excluding the plurality of first clusters;

dist(CX) represents a distance between the centroid C and the centroid X;

dlim represents the detour distance threshold associated with the available ride; and D represents a destination location of the available ride. In an embodiment, D may represent a centroid of a first cluster in the plurality of first clusters that is associated with the point location of the destination location of the available ride.

Based on the equations (8) and (9), the data processor 210 may be configured to determine the set of second clusters from the plurality of clusters.

A person having ordinary skill in the art will understand that the abovementioned exemplary scenario is for illustrative purpose and should not be construed to limit the scope of the disclosure.

Thereafter, the processor 202, in conjunction with the transceiver 206, may be configured to store the ride information, and information about the plurality of first clusters and the set of second clusters pertaining to the available ride in the database server 112. For example, Table 1, as shown below, illustrates an association of the available ride with the plurality of first clusters and the set of second clusters.

TABLE 1

Association of an available ride "R1" with plurality of first clusters and set of second clusters in the plurality of clusters

| Route information (point location) | Plurality of first clusters | Set of second clusters |
|---|---|---|
| $(x_1, y_1)$ | C_1 | C_5 and C_6 |
| $(x_2, y_2)$ | C_2 | C_6 and C_7 |
| $(x_3, y_3)$ | C_2 | C_6 and C_7 |
| $(x_4, y_4)$ | C_3 | C_7 and C_8 |
| $(x_5, y_5)$ | C_3 | C_7 and C_8 |
| $(x_6, y_6)$ | C_4 | C_9 |

In accordance with Table 1, the available ride "R1" may be traveling along a route that has point locations $(x_1,y_1) \rightarrow (x_2,y_2) \rightarrow (x_3,y_3) \rightarrow (x_4,y_4) \rightarrow (x_5,y_5) \rightarrow (x_6,y_6)$. Further, clusters, such as "C_1," "C_2," "C_3," and "C_4," may correspond to the plurality of first clusters and clusters, such as "C_5," "C_6," "C_7," "C_8," and "C_9," may correspond to the set of second clusters.

A person having ordinary skill in the art will understand that the abovementioned table is for illustrative purpose and should not be construed to limit the scope of the disclosure.

Further, the available ride may correspond to a potential ride for the plurality of first clusters and the set of second clusters. In an embodiment, the data processor 210, in conjunction with the pre-processing unit 208, may be configured to update the multi-tier location data by storing the ride information of the potential ride at the one or more memory units, in the database server 112, associated with the corresponding plurality of first clusters and the corresponding set of second clusters. Further, the data processor 210 may be configured to determine an arrival time of the available ride at each of the plurality of first clusters and the set of second clusters. The data processor 210 may be configured to utilize one or more arrival time estimation algorithms known in the art to determine the arrival time of the available ride at each of the plurality of first clusters and the set of second clusters. Further, the data processor 210, in conjunction with the pre-processing unit 208, may be configured to update the multi-tier location data by storing the arrival time of the available ride at the one or more memory units, in the database server 112, associated with the corresponding plurality of first clusters and the corresponding set of second clusters.

At step 310, the ride information pertaining to the available ride is updated based on a part of the corresponding route traversed by the available ride. In an embodiment, the data processor 210, in conjunction with the processor 202, may be configured to update the ride information pertaining to the available ride based on the part of the corresponding route traversed by the available ride. In an embodiment, the data processor 210 may be configured to determine the part of the corresponding route already traversed by the available ride based on information pertaining to real time location of the available ride received from the one or more positional sensors, such as the GPS sensor, in the first agent-computing device 106A.

In an embodiment, the data processor 210 may be further configured to update the association of the available ride with the plurality of first clusters and the set of second clusters in real time. In an embodiment, the data processor 210 may update the association of the available ride with the plurality of first clusters based on the part of the corresponding route traversed by the available ride. The data processor 210 may eliminate the first clusters, from the plurality of first clusters, which are associated with the part of the route already traversed by the available ride. Thus, the data processor 210 may update the association of the available ride with the set of second clusters based on the part of the corresponding route traversed by the available ride and a current detour distance threshold associated with the available ride. Thus, the data processor 210 may eliminate the second clusters, from the set of second clusters, which are associated with the part of the route already traversed by the available ride and fail to satisfy the current detour distance threshold associated with the available ride.

In accordance with Table 1, the available ride may have already crossed the point locations $(x_1,y_1)$ and $(x_2,y_2)$. Based on the part of the route already traversed (i.e., the point locations $(x_1,y_1)$ and $(x_2,y_2)$), the data processor 210 may dynamically update the association of the available ride with the plurality of first clusters and the set of second clusters. Table 2, as shown below, illustrates an updated association of the available ride with the plurality of first clusters and the set of second clusters.

TABLE 2

Updated association of the available ride "R1" with the plurality of first clusters and the set of second clusters in the plurality of clusters

| Route information (point location) | Plurality of first clusters | Set of second clusters |
|---|---|---|
| $(x_3, y_3)$ | C_2 | C_6 and C_7 |
| $(x_4, y_4)$ | C_3 | C_7 and C_8 |
| $(x_5, y_5)$ | C_3 | C_7 and C_8 |
| $(x_6, y_6)$ | C_4 | C_9 |

In accordance with Table 1 and Table 2, the point locations $(x_3,y_3) \rightarrow (x_4,y_4) \rightarrow (x_5,y_5) \rightarrow (x_6,y_6)$ may represent the route that is yet to be traveled by the available ride. Further, based on the updated association clusters, such "C_2," "C_3," and "C_4," may correspond to the plurality of first clusters and clusters, such as "C_6," "C_7," "C_8," and "C_9," may correspond to the set of second clusters. The data processor 210 may update the association of the available ride with the plurality of first clusters by eliminating "C_1," associated with a point location that is already traversed by the available ride. The "C_2" remains to be associated with the available ride as it was associated with two point locations (i.e., "$(x_2,y_2)$" and "$(x_3,y_3)$"), and the point location "$(x_3,y_3)$" is yet to be traversed. Similarly, the data processor 210 may update the association of the available ride with the set of second clusters by eliminating second cluster "C_5," which is associated with a point location that is already traversed by the available ride and further fails to satisfy the current detour threshold associated with the available ride.

A person having ordinary skill in the art will understand that the abovementioned table is for illustrative purpose and should not be construed to limit the scope of the disclosure. Further, the scope of the disclosure is not limited to update the ride information, and the association of the available ride with the plurality of first clusters and the set of second clusters based on the part of the route traversed by the available ride.

In another embodiment, the data processor 210 may be configured to update the ride information, and the association of the available ride with the plurality of first clusters and the set of second clusters based on a ridesharing request addressed by the available ride. For instance, the available ride may take a detour to address a ridesharing request of a user, such as the user 110. In such a case, the data processor 210 may update the previous route of the available ride with a new route. The data processor 210 may further update the count of vacant seats with the count of vacant seats remaining after picking up the user 110. The data processor 210 may further update the detour distance threshold with the detour distance threshold remaining after subtracting the detour distance traveled by the available ride for picking up the user 110. In an embodiment, the remaining detour distance threshold may correspond to the current detour distance threshold associated with the available ride. In an embodiment, the data processor 210 may be further configured to determine the association of the available ride with the plurality of first clusters and the set of second clusters based on the updated new route and the current detour distance threshold. In an embodiment, the data processor 210 may be configured to store the updated ride information in the database server 112.

The control passes to end step 312.

Figure 4:
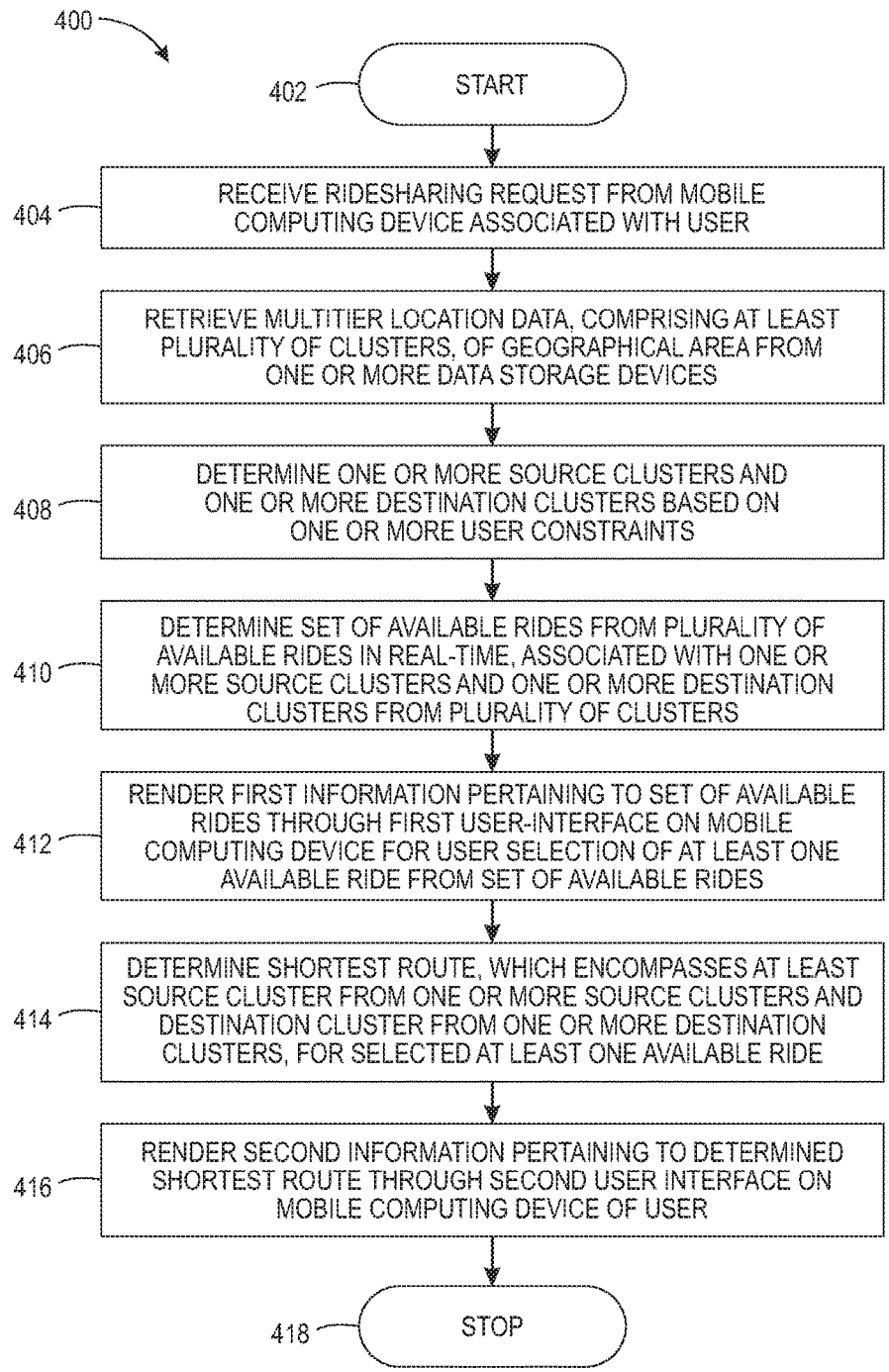
FIG. 4 is another flowchart that illustrates another method of ridesharing management, in accordance with at least one embodiment.

FIG. 4 is another flowchart that illustrates another method of ridesharing management, in accordance with at least one embodiment. FIG. 4 is described in conjunction with FIGS. 1-3. With reference to FIG. 4, there is shown a flowchart 400 that illustrates a method for ridesharing management. A person with ordinary skills in the art will understand that for brevity, the method of ridesharing management is explained for one user, such as the user 110. Notwithstanding, the disclosure may not be so limited, and the method of ridesharing management can be implemented for more than one user, without deviating from the scope of the disclosure. The method starts at step 402 and proceeds to step 404.

At step 404, the ridesharing request is received from the mobile computing device associated with the user. In an embodiment, the processor 202, in conjunction with the transceiver 206, may be configured to receive the ridesharing request from the mobile computing device 108 associated with the user 110. In an embodiment, the ridesharing request may comprise a source location, a destination location, and one or more user constraints specified by the user 110. In an embodiment, the one or more user constraints may comprise the walking distance threshold and the departure time specified by the user 110.

For example, the user 110 may want to travel from a source location "S" to a destination location "D" in an available ride. Thus, the user 110 may transmit a ridesharing request to the ridesharing service platform by utilizing the mobile computing device 108. The user 110 may further specify the one or more user constraints, such as a walking distance threshold "2 km" and a departure time "10:00 a.m." in the ridesharing request.

A person having ordinary skill in the art will understand that the abovementioned example is for illustrative purpose and should not be construed to limit the scope of the disclosure. Further, the scope of the one or more user constraints is not limited to the walking distance threshold and the departure time. In another embodiment, the one or more user constraints may further comprise a preference for co-passengers in the available ride, a route to be excluded, and/or the like.

At step 406, the multi-tier location data, comprising at least the plurality of clusters, is retrieved from one or more data storage devices. In an embodiment, the processor 202, in conjunction with the transceiver 206, may be configured to retrieve the multi-tier location data, comprising at least the plurality of clusters, from the one or more data storage devices, such as the database server 112.

In an embodiment, the data processor 210 may be configured to identify a geographical area associated with the ridesharing request. The identified geographical area may comprise the source location and the destination location specified by the user 110 in the ridesharing request. For example, the user 110 may specify the source location "S" and the destination location "D" in the ridesharing request. Thus, the data processor 210 may identify a geographical area that encompasses the point locations associated with the source location "S" and the destination location "D."

Further, the data processor 210 may be configured to retrieve the multi-tier location data of the identified geographical area from the database server 112.

At step 408, the one or more source clusters and the one or more destination clusters, from the plurality of clusters, are determined based on the one or more user constraints. In an embodiment, the data processor 210, in conjunction with the processor 202, may be configured to determine the one or more source clusters and the one or more destination clusters based on the one or more user constraints.

Before determining the one or more source clusters and the one or more destination clusters, the data processor 210 may be configured to identify a source grid and a destination grid from the plurality of grids in the multi-tier location data. In an embodiment, the source grid may comprise the point location associated with the source location of the user 110 and the destination grid may comprise the point location associated with the destination location of the user 110.

Thereafter, the data processor 210 may be configured to determine the one or more source clusters from the plurality of clusters based on the one or more user constraints, such as the walking distance threshold, specified by the user 110. The data processor 210 may determine the one or more source clusters in such a way that the centroid of each of the one or more source clusters may lie within the walking distance threshold from the centroid of the source grid. For example, the user 110 may have specified the walking distance threshold to be "2 km" in the ridesharing request. Thus, the data processor 210 may determine the one or more source clusters that are within a walking distance of "2 km" from the centroid of the source grid.

Further, the data processor 210 may be configured to determine the one or more destination clusters from the plurality of clusters based on the one or more user constraints, such as the walking distance threshold, specified by the user 110. The data processor 210 may determine the one or more destination clusters in such a way that the centroid of each of the one or more destination clusters may lie within the walking distance threshold from the centroid of the destination grid. For example, the user 110 may have specified the walking distance threshold to be "2 km" in the ridesharing request. Thus, the data processor 210 may determine the one or more destination clusters that are within a walking distance of "2 km" from the centroid of the destination grid.

A person having ordinary skill in the art will understand that the abovementioned examples are for illustrative purpose and should not be construed to limit the scope of the disclosure.

At step 410, the set of available rides from the plurality of available rides is determined in real time. The set of available rides is associated with the one or more source clusters and the one or more destination clusters. In an embodiment, the data processor 210, in conjunction with the processor 202, may be configured to determine the set of available rides, from the plurality of available rides, associated with the one or more source clusters and the one or more destination clusters.

Before determining the set of available rides, in an embodiment, the data processor 210 may be configured to determine one or more available rides from the plurality of available rides that are associated with the one or more source clusters. In an embodiment, a source cluster associated with an available ride may either correspond to a first cluster or a second cluster for the available ride. Thus, the available ride may further correspond to the potential ride for the corresponding source cluster. In an embodiment, the data processor 210 may determine the one or more available rides based on the one or more user constraints, such as the departure time, specified in the ridesharing request. The data processor 210 may be configured to retrieve the ride information and the arrival time information of each potential ride associated with the one or more source clusters from the one or more memory units, associated with the one or more source clusters, in the database server 112. Thereafter, the data processor 210 may be configured to match the arrival time of each of the potential rides, associated with the one or more source clusters, with the departure time specified by the user 110. Further, the data processor 210 may be configured to determine those potential rides as the one or more available rides for which the arrival time matches the departure time.

In an exemplary scenario, the user 110 may have specified the departure time as "10:00 a.m." For a source cluster "C_3" in the one or more clusters, there may be two potential rides, such as available rides "R1" and "R2." The available ride "R1" may have an arrival time "10:30 a.m." and the available ride "R2" may have an arrival time "10:00 a.m." at the source cluster "C_3." The data processor 210 may match the arrival time of both the potential rides "R1" and "R2" with the departure time "10:00 a.m." of the user 110. Based on the match, the data processor 210 may determine the potential ride "R2" as an available ride in the one or more available rides.

A person having ordinary skill in the art will understand that the abovementioned example is for illustrative purpose and should not be construed to limit the scope of the disclosure. Further, the scope of the disclosure is not limited to an exact match between the arrival time of a potential ride, at a source cluster in the one or more source clusters, and the departure time specified by the user 110. In another embodiment, the data processor 210 may be configured to determine a departure time window for the departure time specified by the user 110. For example, the departure time window may cover "5 minutes" before and "10 minutes" after the departure time specified by the user 110. Thereafter, the data processor 210 may be configured to match the arrival time of the potential rides with the departure time window for determining the one or more available rides.

Thereafter, the data processor 210 may be configured to determine details pertaining to the one or more available rides. For an available ride in the one or more available rides, the details may comprise a pickup cluster, a pickup time at the corresponding pickup cluster, a first walking distance, and a first detour distance. In an embodiment, the pickup cluster may correspond to a source cluster, in the one or more source clusters, associated with the corresponding available ride. Further, the pickup time at the corresponding pickup cluster may correspond to the arrival time of the corresponding available ride at the corresponding source cluster. Further, the first walking distance may correspond to a distance to be traveled by the user 110 to reach the corresponding pickup cluster from the source location. Further, the first detour distance may correspond to an extra distance to be traveled by the available ride to reach the pickup cluster to pick the user 110. For example, Table 3, as shown below, illustrates the details pertaining to the one or more available rides.

TABLE 3

Details pertaining to the one or more available rides

| One or more available rides | Pickup cluster | Pickup time | First walking distance | First detour distance |
|---|---|---|---|---|
| R1 | C_1 | 10:00 a.m. | 320 m | 0 |
| R2 | C_4 | 09:58 a.m. | 500 m | 100 m |
| R6 | C_3 | 10:01 a.m. | 870 m | 900 m |
| R7 | C_2 | 10:03 a.m. | 1 km | 2 km |
| R7 | C_5 | 10:05 a.m. | 1.2 km | 500 m |

In accordance with Table 3, the clusters "C_1," "C_4," "C_3," "C_2," and "C_5" represent the one or more source clusters that have potential rides whose arrival time matches the departure time specified by the user 110. Further, for the available ride "R1," the pickup cluster "C_1" corresponds to a first cluster in the plurality of first clusters associated with the available ride "R1" as the detour distance to be traveled by the available ride "R1" to reach at the pickup cluster "C_1" is "zero." Similarly, when the detour distance to be traveled by an available ride, in the one or more available rides, to reach the corresponding pickup cluster is not "zero," the pickup cluster may correspond to a second cluster in the set of second clusters for the corresponding available ride in the one or more available rides. Further, an available ride, such as the ride "R7," may be associated with more than one source cluster such as the clusters "C_2" and "C_5."

A person having ordinary skill in the art will understand that the abovementioned table is for illustrative purpose and should not be construed to limit the scope of the disclosure.

Thereafter, in an embodiment, the data processor 210 may be configured to determine the available rides in the one or more available rides that are associated with the one or more destination clusters. Further, the data processor 210 may be configured to determine a second walking distance and a second detour distance for the available rides in the one or more available rides that are associated with the one or more destination clusters. In an embodiment, the second walking distance may correspond to a distance to be traveled by the user 110 to reach the destination location from the corresponding destination cluster. In an embodiment, the second detour distance may correspond to an extra distance to be traveled by the corresponding available ride from the corresponding destination cluster in the one or more destination clusters to reach the corresponding destination location.

Thereafter, the data processor 210 may be configured to determine a first sum of the first walking distance and the second walking distance for each available ride, in the one or more available rides, which are associated with the one or more destination clusters. The data processor 210 may be configured to determine a second sum of the first detour distance and the second detour distance for each available ride, in the one or more available rides, which are associated with the one or more destination clusters. In an embodiment, the data processor 210 may determine the available rides, in the one or more available rides which are associated with the one or more destination clusters, for which the first sum and the second sum are less than or equal to the walking distance threshold and the detour distance threshold, respectively, as the set of available rides. In other words, for each ride in the set of available rides the one or more user constraints and the one or more pre-determined constraints associated with the corresponding available ride are met while picking/dropping the user 110 from/at the source/destination location. For example, Table 4, as shown below, illustrates a set of available rides, a corresponding source cluster, a corresponding destination cluster, a corresponding first sum, and a corresponding second sum.

TABLE 4

A set of available rides, corresponding source cluster, corresponding destination cluster, corresponding first sum, and corresponding second sum

| Set of available rides | Source cluster (or pickup cluster) | Destination cluster (or drop cluster) | First Sum | Second sum |
|---|---|---|---|---|
| R1 | C_1 | C_6 | 800 m | 500 m |
| R6 | C_3 | C_7 | 900 m | 1.2 km |
| R7 | C_2 | C_7 | 870 m | 2 km |
| R7 | C_5 | C_9 | 1.2 km | 1 km |

In an embodiment, the data processor 210 may be further configured to filter the set of available rides to eliminate duplicate instances of any available ride. For example, in accordance with Table 4, the available ride "R7" has two instances in the set of available rides. In such a scenario, the data processor 210 may be configured to determine an inconvenience score for each duplicate instance of the available rides in the set of available rides. In an embodiment, the data processor 210 may determine the inconvenience score for an available ride by utilizing a function of the walking distance threshold and the detour distance threshold associated with the corresponding available ride. The function may take the first sum and the second sum as inputs and may generate the inconvenience score for the available ride as output. In other words, the data processor 210 may be configured to eliminate duplicate instances of any available ride by maintaining a trade-off between the first sum and the second sum associated with each corresponding duplicate instance.

A person having ordinary skill in the art will understand that the abovementioned table is for illustrative purpose and should not be construed to limit the scope of the disclosure.

At step 412, the first information pertaining to the set of available rides is rendered through the first user-interface on the mobile computing device for user selection of least one available ride from the set of available rides. In an embodiment, the processor 202, in conjunction with the transceiver 206, may be configured to render the first information pertaining to the set of available rides through the first user-interface on the mobile computing device 108 for the user selection of the least one available ride from the set of available rides. In an embodiment, the first information pertaining to an available ride in the set of available rides may comprise details of the corresponding pickup cluster, the corresponding destination cluster, the corresponding pickup time, the details of the corresponding driver, and/or the like.

An embodiment of the first user-interface displayed on the mobile computing device 108 has been described later in FIG. 6.

In an embodiment, the user 110 may utilize the first user-interface to select at least one available ride from the set of available rides. Thereafter, the mobile computing device 108 may be configured to transmit the at least one user selection to the transceiver 206. In an embodiment, the selection of the at least one available ride from the set of available rides may correspond to a booking of the at least one available ride.

At step 414, the shortest route, which encompasses at least a source cluster from the one or more source clusters and a destination cluster from the one or more destination clusters, is determined for the selected at least one available ride. In an embodiment, the data processor 210, in conjunction with the processor 202, may be configured to determine the shortest route, which encompasses at least a source cluster from the one or more source clusters and a destination cluster from the one or more destination clusters, for the selected at least one available ride.

After receiving the user selection of the at least one available ride, the data processor 210 may be configured to determine the shortest route for the selected at least one available ride. In an embodiment, the shortest route associated with the selected at least one available ride may encompass the corresponding source cluster and the corresponding destination cluster. For example, in accordance with Table 4, the user 110 may select the available ride "R1" from the set of available rides. Thus, the data processor 210 may determine the shortest route, which encompasses the pickup cluster (or the source cluster) "C_1" and the destination cluster (or drop cluster) "C_6," for the available ride "R1."

A person having ordinary skill in the art will understand that the abovementioned example is for illustrative purpose and should not be construed to limit the scope of the disclosure.

In an embodiment, the data processor 210 may be configured to utilize the one or more shortest route computation algorithms, such as Dijkstra's algorithm, known in the art for the determination of the shortest route for the selected at least one available ride.

In an embodiment, the data processor 210 may be further configured to update the ride information pertaining to the at least one booked ride (i.e., the selected at least one available ride). The data processor 210 may be configured to update the previous route of the at least one booked ride to the new route (i.e., the shortest route). The data processor 210 may further update the count of vacant seats to the count of vacant seats remaining after picking up the user 110. The data processor 210 may further update the detour distance threshold to the current detour distance threshold that remains after subtracting the second sum from the detour distance threshold. In an embodiment, the data processor 210 may be further configured to determine the association of the available ride with the plurality of first clusters based on the updated route by executing step 310. The data processor 210 may be further configured to determine the association of the available ride with the set of second clusters based on the updated route and the current detour distance threshold by executing step 310 of the flowchart 300 (in FIG. 3). In an embodiment, the data processor 210 may be configured to store the updated ride information pertaining to the at least one booked ride in the database server 112.

At step 416, the second information pertaining to the determined shortest route is rendered through the second user-interface on the mobile computing device of the user. In an embodiment, the processor 202, in conjunction with the transceiver 206, may be configured to render the second information pertaining to the determined shortest route through the second user-interface on the mobile computing device 108 of the user 110. In an embodiment, the second information may further comprise pickup time information of the at least one booked ride. In an embodiment, the data processor 210 may be further configured to update the second information based on real time traffic information retrieved from one or more traffic tracking agencies.

In an embodiment, the processor 202, in conjunction with the transceiver 206, may be further configured to render the second information pertaining to the determined shortest route on the agent-computing device of the driver associated with the at least one booked ride. In another embodiment, the processor 202 may further transmit identification information, such as a user name and a user identification number, of the user 110 to the agent-computing device, such as one of the plurality of agent-computing devices 106, of the driver associated with the at least one booked ride.

An embodiment of the second user-interface displayed on the mobile computing device 108 has been described later in FIG. 7.

The control passes to end step 418.

Figure 5A:
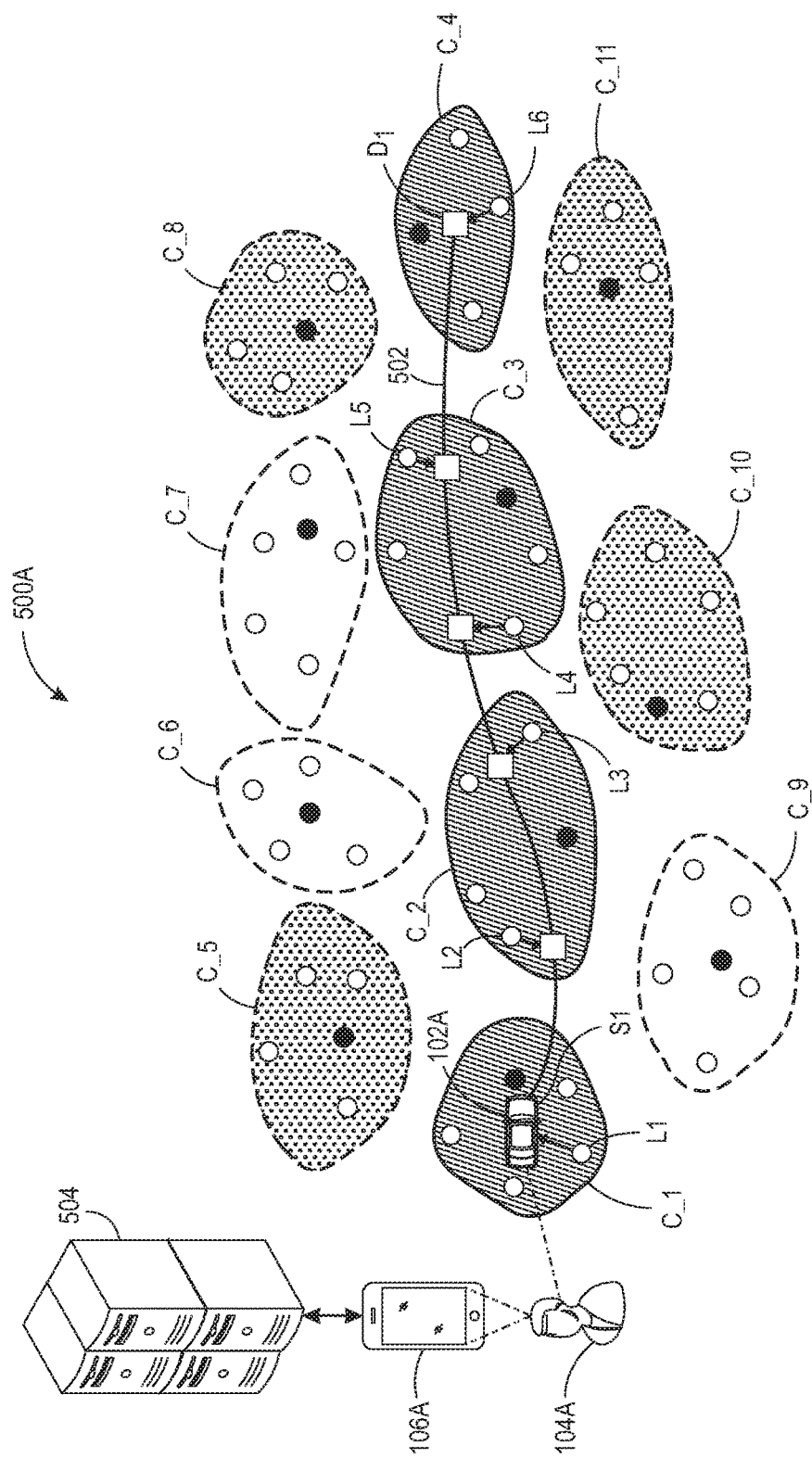
FIG. 5A is an exemplary scenario that illustrates a plurality of first clusters and a set of second clusters associated with an available ride, in accordance with at least one embodiment.

FIG. 5A is an exemplary scenario that illustrates a plurality of first clusters and a set of second clusters associated with an available ride, in accordance with at least one embodiment. FIG. 5A is described in conjunction with FIGS. 1-4.

With reference to FIG. 5A, there is shown an exemplary scenario 500A that includes the first vehicle 102A associated with the first driver 104A. The exemplary scenario 500A further includes a route 502 in a geographical area. The first driver 104A may be traveling along the route 502 from a source location "$S_1$" to a destination location "$D_1$." The first vehicle 102A may have "three vacant seats." Thus, the first driver 104A may utilize the first agent-computing device 106A to transmit a ride offer to a ridesharing management server 504, such as the application server 114. The first driver 104A may specify a detour distance threshold (i.e., the one or more pre-determined constraints) "4 km" in the ride offer.

Thereafter, based on the ride offer, the ridesharing management server 504 may retrieve the multi-tier location data of the geographical area. Thereafter, the ridesharing management server 504 may utilize point locations associated with the route 502 to identify grids, from the plurality of grids in the multi-tier location data, associated with the route 502. Further, the ridesharing management server 504 may identify landmarks, such as "L1," "L2," "L3," "L4," "L5," and "L6," which are associated with the identified grids. Further, the ridesharing management server 504 may determine clusters, such as "C_1," "C_2," "C_3," and "C_4," in the plurality of clusters that are associated with the identified landmarks, such as "L1," "L2," "L3," "L4," "L5," and "L6." The identified clusters "C_1," "C_2," "C_3," and "C_4" correspond to the plurality of first clusters for the available ride. The plurality of first clusters "C_1," "C_2," "C_3," and "C_4" may correspond to pass-through clusters for the available ride.

Thereafter, the ridesharing management server 504 may determine clusters, such as "C_5" to "C_11," associated with the plurality of first clusters "C_1," "C_2," "C_3," and "C_4" by utilizing equation (8). Further, the ridesharing management server 504 may utilize equation (9) to determine clusters "C_5," "C_8," "C_10," and "C_11" from previously determined clusters "C_5" to "C_11." The clusters "C_5," "C_8," "C_10," and "C_11" represent the set of second clusters for the available ride. Further, the available ride (i.e., the first vehicle 102A) corresponds to a potential ride for the plurality of first clusters "C_1" to "C_4" and the set of second clusters "C_5," "C_8," "C_10," and "C_11." The ridesharing management server 504 may further determine an arrival time of the available ride at each of the plurality of first clusters "C_1" to "C_4" and the set of second clusters "C_5," "C_8," "C_10," and "C_11."

A person having ordinary skill in the art will understand that the abovementioned exemplary scenario is for illustrative purpose and should not be construed to limit the scope of the disclosure.

Figure 5B:
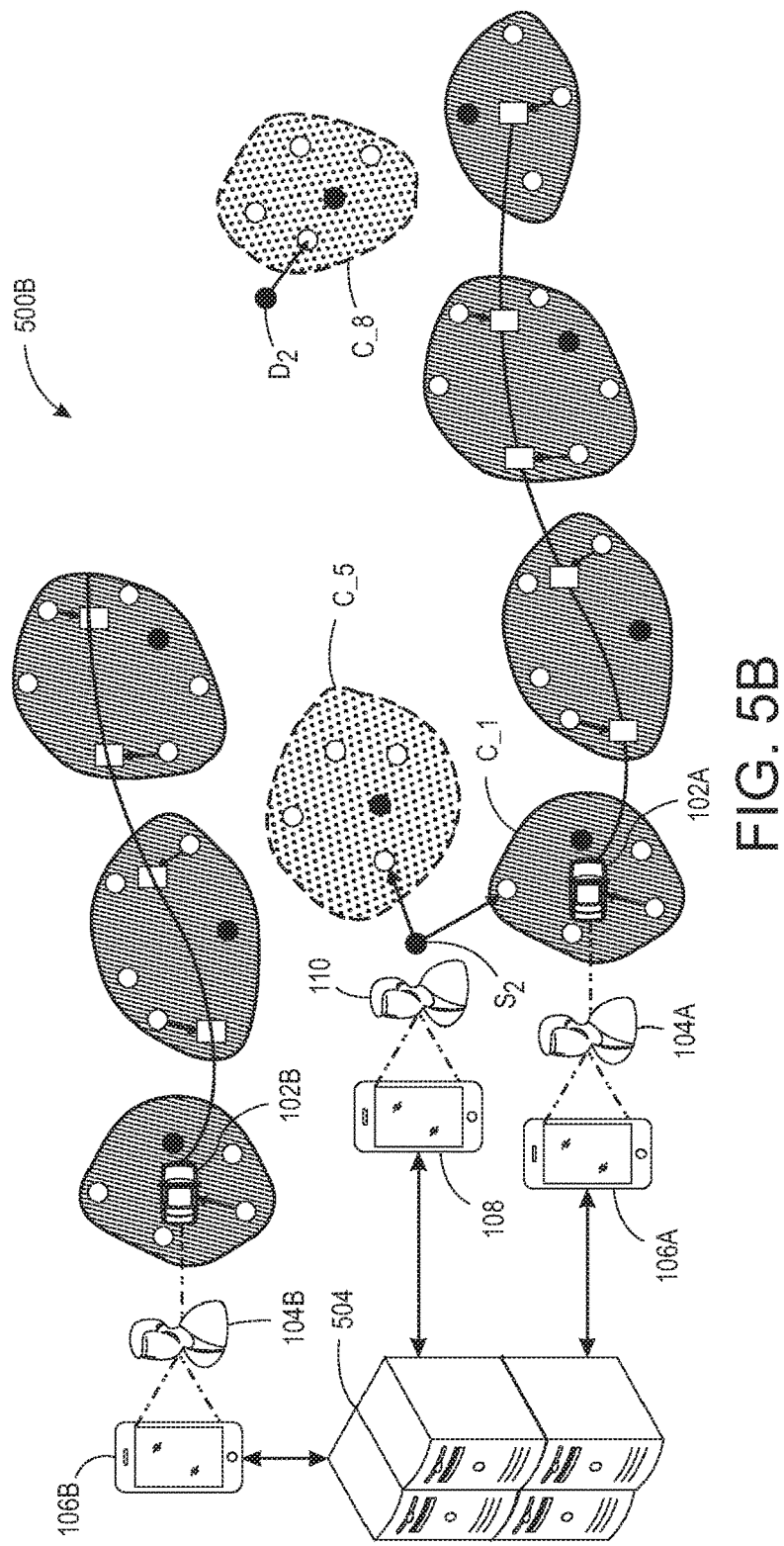
FIG. 5B is an exemplary scenario that illustrates a process of determination of a set of available rides for a ridesharing request, in accordance with at least one embodiment.

FIG. 5B is an exemplary scenario that illustrates a determination of a set of available rides for a ridesharing request. FIG. 5B is described in conjunction with FIGS. 1-5A.

With reference to FIG. 5B, there is shown an exemplary scenario 500B that comprises the user 110. The user 110 may utilize the mobile computing device 108 to transmit a rideshare request to the ridesharing management server 504. The rideshare request may comprise a source location "$S_2$," a destination location "$D_2$," and one or more user constraints, such as the walking distance threshold "2 km" and a departure time "10:00 a.m."

Based on the rideshare request, the ridesharing management server 504 may determine the one or more source clusters, such as "C_1" and "C_5," from the plurality of clusters in the multi-tier location data. The one or more source clusters "C_1" and "C_5," are determined such that at least one landmark in each of the one or more source clusters "C_1" and "C_5" lies within the walking distance threshold "2 km" from the source location "$S_2$." Further, the ridesharing management server 504 may determine the one or more destination clusters, such as "C_8," from the plurality of clusters in the multi-tier location data. The one or more destination clusters, such as "C_8," are determined such that at least one landmark in each of the one or more destination clusters "C_8" lies within the walking distance threshold "2 km" from the destination location "$D_2$."

Thereafter, the ridesharing management server 504 may determine one or more available rides, such as "R1" and "R2," from the plurality of available rides that are associated with the one or more source clusters "C_1" and "C_5." The available ride "R1" corresponds to the first vehicle 102A associated with the first driver 104A and the available ride "R2" corresponds to the second vehicle 102B associated with the second driver 104B. The available ride "R1" is associated with the one or more source clusters "C_1" and "C_5." The source cluster "C_1" may correspond to a first cluster in a plurality first clusters associated with the available ride "R1" and the source cluster "C_5" may correspond to a second cluster in a set of second clusters associated with the available ride "R1." The available ride "R2" is associated with the one or more source clusters "C_5." The source cluster "C_5" may correspond to a second cluster in a set of second clusters associated with the available ride "R2." Further, the arrival time of the one or more available rides "R1" and "R2" at the corresponding clusters, such as "C_1" and "C_5," and "C_5," respectively, matches the departure time of the user 110. Further, the ridesharing management server 504 may determine that the available ride "R1" is associated with the one or more destination clusters "C_8" and the available ride "R2" is not associated with any of the one or more destination clusters "C_8." Therefore, the ridesharing management server 504 may determine the available ride "R1" as the set of available rides from the one or more available rides "R1" and "R2" based on the association of the available ride "R1" with at least one destination cluster "C_8" in the one or more destination clusters. The available ride "R1" further satisfies the one or more user constraints and the one or more pre-determined constraints.

Further, the ridesharing management server 504 may transmit the first information pertaining to the available ride "R1" to the mobile computing device 108 of the user 110. Further, when the user 110 selects the available ride "R1" for traveling from the source location "$S_2$" to the destination location "$D_2$," the ridesharing management server 504 may determine the shortest route, which encompasses at least one source cluster, such as one of "C_1" and "C_5," and one destination cluster, such as "C_8," for the selected at least one available ride "R1." Further, the ridesharing management server 504 may transmit the second information pertaining to the available ride "R1" to the mobile computing device 108 of the user 110 and the first agent-computing device 106A associated with the selected at least one available ride "R1."

A person having ordinary skill in the art will understand that the abovementioned example is for illustrative purpose and should not be construed to limit the scope of the disclosure.

Figure 6:
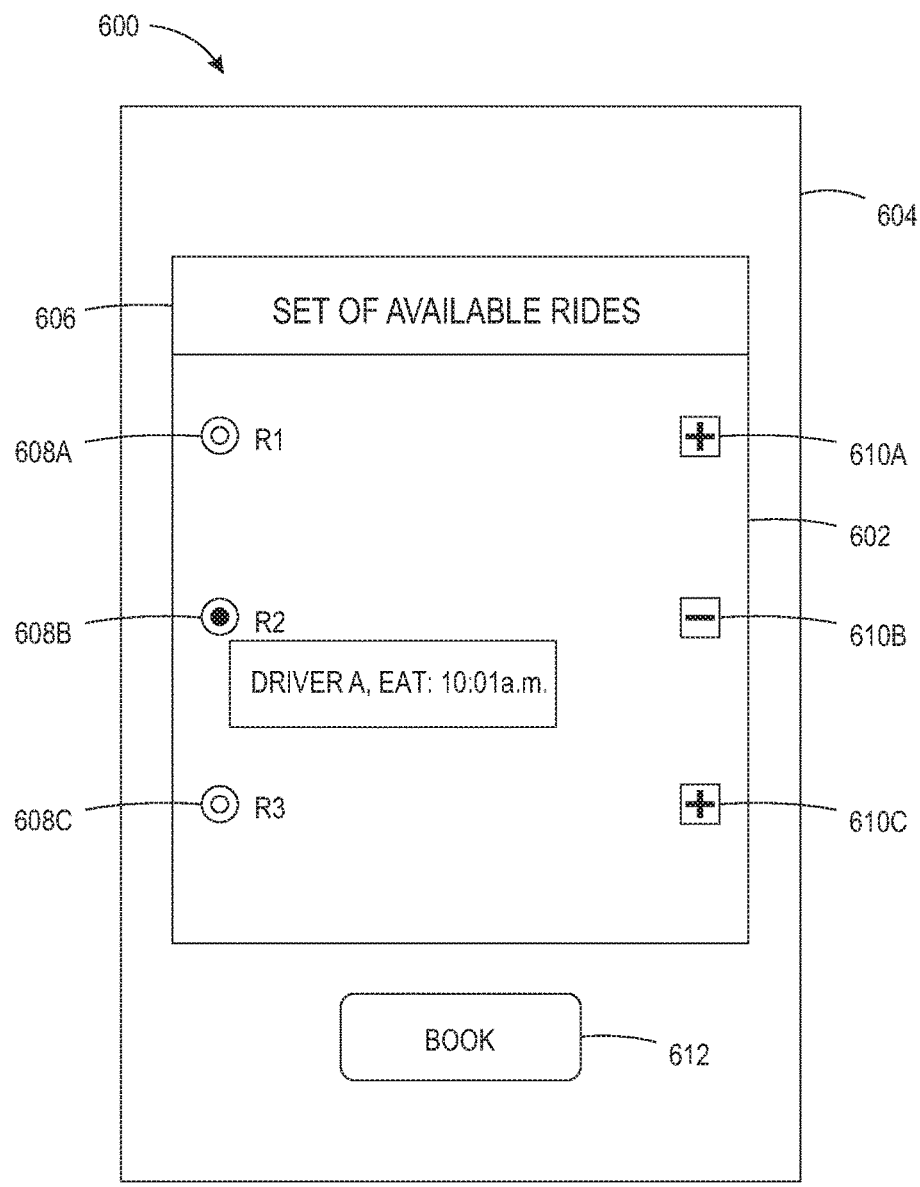
FIG. 6 is a block diagram that illustrates an exemplary scenario for presenting a first user-interface on a mobile computing device associated with a user, in accordance with at least one embodiment.

FIG. 6 is a block diagram that illustrates an exemplary scenario for presenting a first user-interface on a mobile computing device associated with a user, in accordance with at least one embodiment. FIG. 6 is described in conjunction with FIGS. 1-5B.

With reference to FIG. 6, there is shown an exemplary scenario 600 for presenting a first user-interface 602 to the user 110 on a display screen 604 of the mobile computing device 108. The first user-interface 602 presents the first information pertaining to the set of available rides 606. Further, each available ride, such as "R1," "R2," and "R3," in the set of available rides 606, is associated with a radio button, such as radio button 608A, 608B, and 608C, respectively, and an expansion/collapse field, such as 610A, 610B, and 610C, respectively. The user 110 may select any available ride in the set of available rides by clicking on the corresponding radio button, such as 608B. The user 110 may further view the first information, such as "DRIVER A, EAT: 10:01 a.m.," pertaining to any available ride in the set of available rides by clicking on the expansion/collapse field, such as 610B. The first user-interface 602 further includes a button "BOOK" 612. The user 110 may click on the button "BOOK" 612 to book the selected available rides.

A person having ordinary skill in the art will understand that the abovementioned example is for illustrative purpose and should not be construed to limit the scope of the disclosure.

Figure 7:
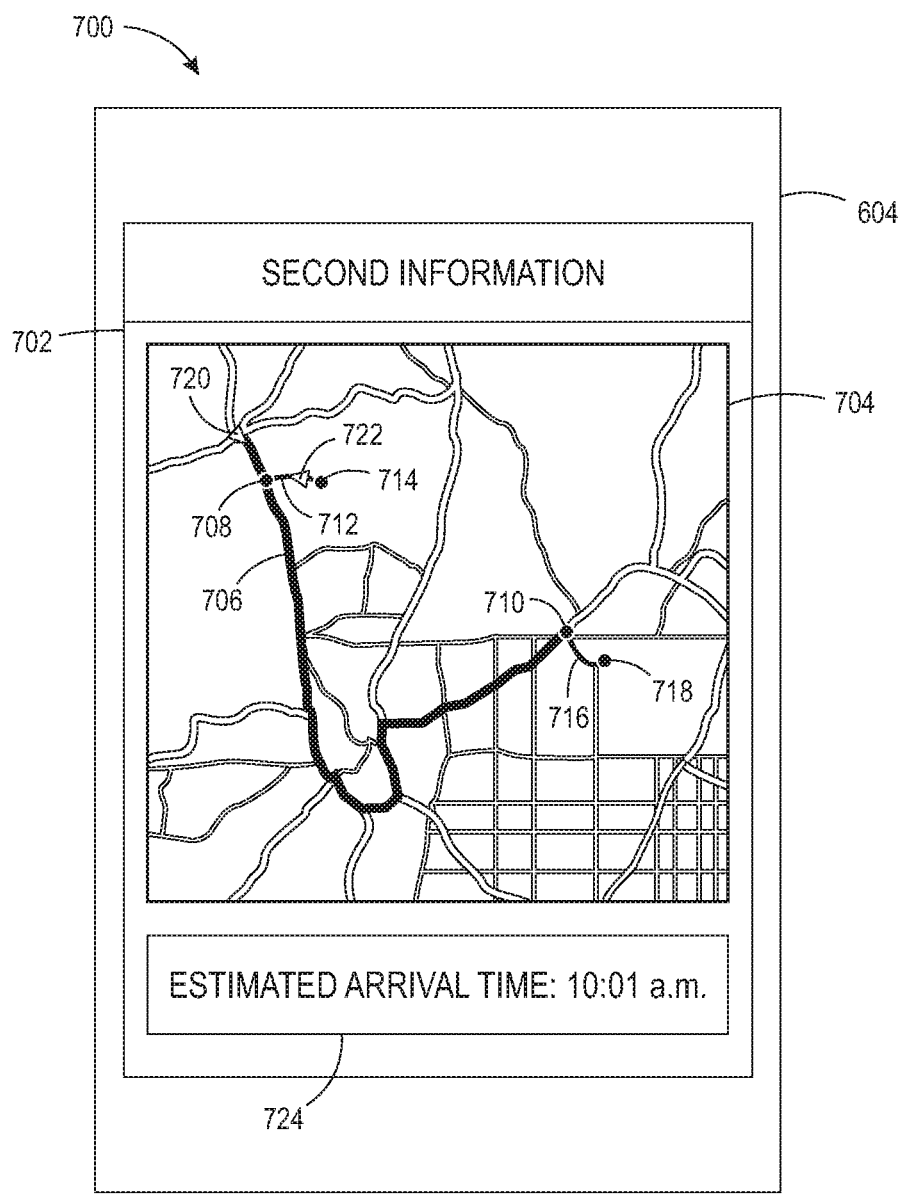
FIG. 7 is a block diagram that illustrates an exemplary scenario for presenting a second user-interface on a mobile computing device associated with a user, in accordance with at least one embodiment.

FIG. 7 is a block diagram that illustrates an exemplary scenario for presenting a second user-interface on a mobile computing device associated with a user, in accordance with at least one embodiment. FIG. 7 is described in conjunction with FIGS. 1-6.

With reference to FIG. 7, there is shown an exemplary scenario 700 for presenting a second user-interface 702 to the user 110 on the display screen 604 of the mobile computing device 108. The second user-interface 702 presents a navigational map 704 comprising a route 706 (i.e., the determined shortest route) determined by the application server 114 for the selected at least one available ride. The route 706 displays a pickup location 708 and a drop location 710. In an embodiment, the route 706 displays a walking route 712 from a source location 714 to the pickup location 708, when the user 110 has to walk a distance to reach the pickup location 708. Further, in an embodiment, the route 706 displays a walking route 716 from the drop location 710 to a destination location 718 of the user 110, when the user 110 has to walk a distance to reach the destination location 718. In an embodiment, a current location 720 of the selected at least one available ride and a current location 722 of the user 110 are also displayed on the navigational map 704. An estimated arrival time of the selected at least one available ride is also displayed to the user 110 as a graphical and/or textual indication 724 in the second user-interface 702.

A person having ordinary skill in the art will understand that the abovementioned example is for illustrative purpose and should not be construed to limit the scope of the disclosure. Further, the scope of the disclosure is not limited to display the second user-interface to the user 110. In another embodiment, the second user-interface may also be rendered on the agent-computing device associated with the driver of the selected at least one available ride.

The disclosed embodiments encompass numerous advantages. The disclosure provides a method and a system data processing by a computing device for ridesharing management. The disclosed method provides a peer-to-peer ridesharing platform that is capable of managing real time ride offers and ridesharing requests. Further, the disclosed method uses a hierarchal region discretization (i.e., multi-tier location data) and in-memory ride indexing at the plurality of clusters in the multi-tier location data. Further, ride information pertaining to any potential ride associated with a cluster is stored at a cluster level in the multi-tier location data. Further, the disclosed method uses an approximation technique with zero shortest route computation at the time of determining a set of available rides for multiple ridesharing requests. Thus, the disclosed method requires less computational time for determining the set of available rides during high look-to-book scenarios. Further, the disclosed method ensures privacy for commuters, associated with the ridesharing requests, as information pertaining to source location and destination location of each commuter is not shared with the driver of a booked available ride. The driver of the booked available ride is only provided with information pertaining to a source cluster from where a commuter is to be picked up and a destination cluster, where the commuter is to be dropped. The disclosed method and system can be used by a plurality of users who may want to offer/avail vehicles for ridesharing.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit, and the internet. The computer further comprises a microprocessor. The microprocessor is connected to a communication bus. The computer also includes a memory. The memory may be RAM or ROM. The computer system further comprises a storage device, which may be a HDD or a removable storage drive such as a floppy-disk drive, an optical-disk drive, and the like. The storage device may also be a means for loading computer programs or other instructions onto the computer system. The computer system also includes a communication unit. The communication unit allows the computer to connect to other databases and the internet through an input/output (I/O) interface, allowing the transfer as well as reception of data from other sources. The communication unit may include a modem, an Ethernet card, or other similar devices that enable the computer system to connect to databases and networks, such as, LAN, MAN, WAN, and the internet. The computer system facilitates input from a user through input devices accessible to the system through the I/O interface.

To process input data, the computer system executes a set of instructions stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks, such as steps that constitute the method of the disclosure. The systems and methods described can also be implemented using only software programming or only hardware, or using a varying combination of the two techniques. The disclosure is independent of the programming language and the operating system used in the computers. The instructions for the disclosure can be written in all programming languages, including, but not limited to, 'C', 'C++', 'Visual C++' and 'Visual Basic'. Further, software may be in the form of a collection of separate programs, a program module containing a larger program, or a portion of a program module, as discussed in the ongoing description. The software may also include modular programming in the form of object-oriented programming. The processing of input data by the processing machine may be in response to user commands, the results of previous processing, or from a request made by another processing machine. The disclosure can also be implemented in various operating systems and platforms, including, but not limited to, 'Unix', 'DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

Various embodiments of the method and system for ridesharing management have been disclosed. However, it should be apparent to those skilled in the art that modifications in addition to those described are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or used, or combined with other elements, components, or steps that are not expressly referenced.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like.

The claims can encompass embodiments for hardware and software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art, which are also intended to be encompassed by the following claims.

What is claimed is:

1. A method of data processing by a computing device for ridesharing management, the method comprising:
  retrieving, by one or more processors in the computing device, multi-tier location data, comprising at least a plurality of clusters, of a geographical area from one or more data storage devices based on a ridesharing request received from a mobile computing device associated with a user,
   wherein the ridesharing request comprises a source location, a destination location, and one or more user constraints, and
   wherein the one or more user constraints comprises at least a walking distance threshold identifying a maximum distance to travel to reach a pickup location;
  determining, by the one or more processors, a set of available rides from a plurality of available rides in real time, associated with one or more source clusters and one or more destination clusters from the plurality of clusters, based on at least the one or more user constraints and one or more pre-determined constraints associated with each of the plurality of available rides, wherein a distance from the source location to the one or more source clusters and a distance from the destination location to the one or more destination clusters falls within the walking distance threshold, and wherein an available ride in the plurality of available rides is associated with a plurality of first clusters from the plurality of clusters and a set of second clusters from the plurality of clusters, based on the one or more pre-determined constraints;

updating, by the one or more processors, the association of the available ride with the plurality of first clusters and the set of second clusters in real time, wherein the association of the available ride with the plurality of first clusters is updated based on a part of a corresponding route traversed by the available ride, and wherein the association of the available ride with the set of second clusters is updated based on the part of the corresponding route traversed by the available ride and a current detour distance threshold associated with the available ride;

rendering, by the one or more processors, first information pertaining to the set of available rides through a first user-interface on the mobile computing device for user selection of at least one available ride from the set of available rides;

determining, by the one or more processors, a shortest route, which encompasses at least a source cluster from the one or more source clusters and a destination cluster from the one or more destination clusters, for the selected at least one available ride; and rendering, by the one or more processors, a visualization of the shortest route through a second user-interface on the mobile computing device, wherein the visualization comprises a driving route for the selected at least one available ride and walking route from the source location to the pickup location and a walking route from a drop-off location to the destination location.

2. The method of claim 1, wherein each cluster from the plurality of clusters in the multi-tier location data comprises one or more landmarks from a plurality of landmarks in the geographical area, wherein each landmark is associated with a set of grids from a plurality of grids in the geographical area.

3. The method of claim 2, wherein the one or more landmarks in a cluster from the plurality of clusters are within a pre-determined distance from each other.

4. The method of claim 1, wherein the one or more user constraints comprises a departure time specified by the user.

5. The method of claim 1, wherein the one or more pre-determined constraints associated with an available ride from the plurality of available rides comprise at least a detour distance threshold specified by a driver and/or a service provider associated with the available ride.

6. The method of claim 1, wherein a cluster from the plurality of clusters in the multi-tier location data is associated with one or more available rides from the plurality of available rides, based on the one or more pre-determined constraints.

7. The method of claim 1, further comprising determining, by the one or more processors, ride information corresponding to each of the plurality of available rides, wherein the ride information corresponding to an available ride from the plurality of available rides comprises a source location of the available ride, a destination location of the available ride, a count of vacant seats in the available ride, and a route of the available ride.

8. The method of claim 7, further comprising updating, by the one or more processors, the ride information pertaining to the selected at least one available ride based on the selection of the at least one available ride by the user.

9. The method of claim 1, further comprising determining, by the one or more processors, the one or more source clusters and the one or more destination clusters, based on the one or more user constraints, wherein the one or more source clusters are associated with the source location and the one or more destination clusters are associated with the destination location.

10. A system of data processing by a computing device for ridesharing management, the system comprising:

one or more processors in the computing device configured to:

retrieve multi-tier location data, comprising at least a plurality of clusters, of a geographical area from one or more data storage devices based on a ridesharing request received from a mobile computing device associated with a user, wherein the ridesharing request comprises a source location, a destination location, and one or more user constraints, and wherein the one or more user constraints comprises at least a walking distance threshold identifying a maximum distance to travel to reach a pickup location;

determine a set of available rides from a plurality of available rides in real time, associated with one or more source clusters and one or more destination clusters from the plurality of clusters, based on at least the one or more user constraints and one or more pre-determined constraints associated with each of the plurality of available rides, wherein a distance from the source location to the one or more source clusters and a distance from the destination location to the one or more destination clusters falls within the walking distance threshold, and wherein an available ride in the plurality of available rides is associated with a plurality of first clusters from the plurality of clusters and a set of second clusters from the plurality of clusters, based on the one or more pre-determined constraints;

update the association of the available ride with the plurality of first clusters and the set of second clusters in real time, wherein the association of the available ride with the plurality of first clusters is updated based on a part of a corresponding route traversed by the available ride, and wherein the association of the available ride with the set of second clusters is updated based on the part of the corresponding route traversed by the available ride and a current detour distance threshold associated with the available ride;

render first information pertaining to the set of available rides through a first user-interface on the mobile computing device for user selection of at least one available ride from the set of available rides;

determine a shortest route, which encompasses at least a source cluster from the one or more source clusters and a destination cluster from the one or more destination clusters, for the selected at least one available ride; and render, by the one or more processors, a visualization of the shortest route through a second user-interface on the mobile computing device, wherein the visualization comprises a driving route for the selected at least one available ride and walking route from the source location to the pickup location and a walking route from a drop-off location to the destination location.

11. The system of claim 10, wherein each cluster from the plurality of clusters in the multi-tier location data comprises one or more landmarks from a plurality of landmarks in the geographical area, wherein each landmark is associated with a set of grids from a plurality of grids in the geographical area, wherein the one or more landmarks in a cluster from the plurality of clusters are within a pre-determined distance from each other.

12. The system of claim 10, wherein the one or more user constraints comprise comprises a departure time specified by the user.

13. The system of claim 10, wherein the one or more pre-determined constraints associated with an available ride from the plurality of available rides comprise at least a detour distance threshold specified by a driver and/or a service provider associated with the available ride.

14. The system of claim 10, wherein the one or more processors are further configured to determine ride information corresponding to each of the plurality of available rides, wherein the ride information corresponding to an available ride from the plurality of available rides comprises a source location of the available ride, a destination location of the available ride, a count of vacant seats in the available ride, and a route of the available ride.

15. The system of claim 14, wherein the one or more processors are further configured to update the ride information pertaining to the selected at least one available ride based on the selection of the at least one available ride by the user.

16. The system of claim 10, wherein the one or more processors are further configured to determine the one or more source clusters and the one or more destination clusters, based on the one or more user constraints, wherein the one or more source clusters are associated with the source location and the one or more destination clusters are associated with the destination location.

17. A system of data processing by a mobile computing device for ridesharing management, the system comprising:
one or more processors in the mobile computing device configured to:
transmit a ridesharing request to a computing device,
wherein the ridesharing request comprises a source location, a destination location, and one or more user constraints specified by a user associated with the mobile computing device, and
wherein the one or more user constraints comprises at least a walking distance threshold identifying a maximum distance to travel to reach a pickup location;
receive first information pertaining to a set of available rides from the computing device,
wherein the set of available rides is determined by the computing device in real time, based on at least the one or more user constraints and one or more pre-determined constraints associated with each of a plurality of available rides,
wherein the set of available rides is associated with one or more source clusters and one or more destination clusters from a plurality of clusters in multi-tier location data,
wherein a distance from the source location to the one or more source clusters and a distance from the destination location to the one or more destination clusters falls within the walking distance threshold, and
wherein an available ride in the plurality of available rides is associated with a plurality of first clusters from the plurality of clusters and a set of second clusters from the plurality of clusters, based on the one or more pre-determined constraints;
update the association of the available ride with the plurality of first clusters and the set of second clusters in real time,
wherein the association of the available ride with the plurality of first clusters is updated based on a part of a corresponding route traversed by the available ride, and
wherein the association of the available ride with the set of second clusters is updated based on the part of the corresponding route traversed by the available ride and a current detour distance threshold associated with the available ride;
transmit a user selection of at least one available ride from the set of available rides to the computing device;
receive second information pertaining to a shortest route, which encompasses at least a source cluster from the one or more source clusters and a destination cluster from the one or more destination clusters, for the selected at least one available ride from the computing device, wherein the shortest route is determined by the computing device; and
displaying a visualization of the shortest route, wherein the visualization comprises a driving route for the selected at least one available ride and walking route from the source location to the pickup location and a walking route from a drop-off location to the destination location.

18. A computer program product for use with a computer, the computer program product comprising a non-transitory computer readable medium, wherein the non-transitory computer readable medium stores a computer program code for data processing for ridesharing management, wherein the computer program code is executable by one or more processors in a computing device to:
retrieve multi-tier location data, comprising at least a plurality of clusters, of a geographical area from one or more data storage devices based on a ridesharing request received from a mobile computing device associated with a user,
wherein the ridesharing request comprises a source location, a destination location, and one or more user constraints, and
wherein the one or more user constraints comprises at least a walking distance threshold identifying a maximum distance to travel to reach a pickup location;
determine a set of available rides from a plurality of available rides in real time, associated with one or more source clusters and one or more destination clusters from the plurality of clusters, based on at least the one or more user constraints and one or more pre-determined constraints associated with each of the plurality of available rides, wherein a distance from the source location to the one or more source clusters and a distance from the destination location to the one or more destination clusters falls within the walking distance threshold, and wherein an available ride in the plurality of available rides is associated with a plurality of first clusters from the plurality of clusters and a set of second clusters from the plurality of clusters, based on the one or more pre-determined constraints;

update the association of the available ride with the plurality of first clusters and the set of second clusters in real time, wherein the association of the available ride with the plurality of first clusters is updated based on a part of a corresponding route traversed by the available ride, and wherein the association of the available ride with the set of second clusters is updated based on the part of the corresponding route traversed by the available ride and a current detour distance threshold associated with the available ride;

render first information pertaining to the set of available rides through a first user-interface on the mobile computing device for user selection of at least one available ride from the set of available rides;

determine a shortest route, which encompasses at least a source cluster from the one or more source clusters and a destination cluster from the one or more destination clusters, for the selected at least one available ride, wherein second information pertaining to the determined shortest route is rendered through a second user-interface on the mobile computing device of the user; and render, by the one or more processors, a visualization of the shortest route through a second user-interface on the mobile computing device, wherein the visualization comprises a driving route for the selected at least one available ride and walking route from the source location to the pickup location and a walking route from a drop-off location to the destination location.

* * * * *